United States Patent
Andrews, II et al.

(10) Patent No.: US 12,075,127 B2
(45) Date of Patent: Aug. 27, 2024

(54) METHOD AND SYSTEM FOR GENERATION AND PLAYBACK OF SUPPLEMENTED VIDEOS

(71) Applicant: AiBUY, Inc., Dallas, TX (US)

(72) Inventors: James K. Andrews, II, Newport Beach, CA (US); Timothy M. Monaghan, Laguna Beach, CA (US)

(73) Assignee: AiBUY Holdco, Inc., Plano, TX (US)

( * ) Notice: Subject to any disclaimer, the term of this patent is extended or adjusted under 35 U.S.C. 154(b) by 0 days.

(21) Appl. No.: 17/964,743

(22) Filed: Oct. 12, 2022

(65) Prior Publication Data
US 2023/0283853 A1    Sep. 7, 2023

Related U.S. Application Data

(63) Continuation of application No. 17/210,045, filed on Mar. 23, 2021, now Pat. No. 11,516,551, which is a
(Continued)

(51) Int. Cl.
*H04N 21/4725* (2011.01)
*G06F 3/0482* (2013.01)
(Continued)

(52) U.S. Cl.
CPC ....... *H04N 21/4725* (2013.01); *G06F 3/0482* (2013.01); *G06F 3/04847* (2013.01);
(Continued)

(58) Field of Classification Search
CPC ............ H04N 21/4725; H04N 21/235; H04N 21/2547; H04N 21/2668; H04N 21/43;
(Continued)

(56) References Cited

U.S. PATENT DOCUMENTS

| | | |
|---|---|---|
| 5,774,664 A | 6/1998 | Hidary et al. |
| 5,778,181 A | 7/1998 | Hidary et al. |

(Continued)

FOREIGN PATENT DOCUMENTS

| | | |
|---|---|---|
| JP | 2002541684 A | 12/2002 |
| WO | WO-0169364 A2 | 9/2001 |

(Continued)

OTHER PUBLICATIONS

"About Rich Media Guidelines Compliance: In-Page Units," Jan. 7, 2007, 2 pages.
(Continued)

*Primary Examiner* — Nnenna N Ekpo
(74) *Attorney, Agent, or Firm* — COOLEY LLP

(57) ABSTRACT

The present invention is a method and system for generation and playback of supplemented videos which include interactive features. The supplemented video includes hotspots that allow a video viewer to interact with the video when the video viewer sees an object. The hotspots can be manually defined. Information regarding the object and the hotspot can be stored in a separate XML file. Furthermore, the present invention can be a marketplace where a desired object can be found by searching the XML file. The search results can list the supplemented videos which contain hotspots corresponding to the object and also the time in the supplemented video in which the object is found. The present invention can also aggregate data about the objects based on the playback of the supplemented videos and the video viewer's interaction with the supplemented videos.

20 Claims, 21 Drawing Sheets

Related U.S. Application Data continuation of application No. 16/268,956, filed on Feb. 6, 2019, now Pat. No. 10,986,412, which is a continuation of application No. 14/800,581, filed on Jul. 15, 2015, now Pat. No. 10,225,614, which is a continuation of application No. 13/753,384, filed on Jan. 29, 2013, now Pat. No. 9,210,472, which is a continuation of application No. 12/434,569, filed on May 1, 2009, now Pat. No. 9,113,214.

(60) Provisional application No. 61/050,206, filed on May 3, 2008.

(51) Int. Cl.
| | |
|---|---|
| *G06F 3/04847* | (2022.01) |
| *G06F 16/43* | (2019.01) |
| *G06Q 30/02* | (2023.01) |
| *G06Q 30/0251* | (2023.01) |
| *G06Q 30/0601* | (2023.01) |
| *H04N 21/235* | (2011.01) |
| *H04N 21/2547* | (2011.01) |
| *H04N 21/2668* | (2011.01) |
| *H04N 21/43* | (2011.01) |
| *H04N 21/435* | (2011.01) |
| *H04N 21/478* | (2011.01) |
| *H04N 21/81* | (2011.01) |
| *H04N 21/858* | (2011.01) |

(52) U.S. Cl.
CPC ............ *G06F 16/43* (2019.01); *G06Q 30/02* (2013.01); *G06Q 30/0251* (2013.01); *G06Q 30/0601* (2013.01); *H04N 21/235* (2013.01); *H04N 21/2547* (2013.01); *H04N 21/2668* (2013.01); *H04N 21/43* (2013.01); *H04N 21/435* (2013.01); *H04N 21/47815* (2013.01); *H04N 21/812* (2013.01); *H04N 21/8133* (2013.01); *H04N 21/8583* (2013.01)

(58) Field of Classification Search
CPC ........... H04N 21/435; H04N 21/47815; H04N 21/812; H04N 21/8133; H04N 21/8583; G06F 16/43; G06F 3/0482; G06F 3/04847; G06Q 30/02; G06Q 30/0251; G06Q 30/0601
See application file for complete search history.

(56) References Cited

U.S. PATENT DOCUMENTS

| | | |
|---|---|---|
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,154,771 A | 11/2000 | Rangan et al. |
| 6,169,573 B1 | 1/2001 | Sampath-Kumar et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,536,041 B1 | 3/2003 | Knudson et al. |
| 6,564,380 B1 | 5/2003 | Murphy |
| 6,628,307 B1 | 9/2003 | Fair |
| 6,766,528 B1 | 7/2004 | Kim et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,136,853 B1 | 11/2006 | Kohda et al. |
| 7,158,676 B1 | 1/2007 | Rainsford |
| 7,162,263 B2 | 1/2007 | King et al. |
| 7,188,186 B1 | 3/2007 | Meyer et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,269,837 B1 | 9/2007 | Redling et al. |
| 7,331,057 B2 | 2/2008 | Eldering et al. |
| 7,337,457 B2 | 2/2008 | Pack et al. |
| 7,353,186 B2 | 4/2008 | Kobayashi |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,493,636 B2 | 2/2009 | Kitsukawa et al. |
| 7,509,340 B2 | 3/2009 | Fenton et al. |
| 7,539,738 B2 | 5/2009 | Stuckman et al. |
| 7,574,381 B1 | 8/2009 | Lin-Hendel |
| 7,593,965 B2 | 9/2009 | Gabriel |
| 7,607,107 B2 | 10/2009 | Iten et al. |
| 7,613,691 B2 | 11/2009 | Finch |
| 7,614,013 B2 | 11/2009 | Dollar et al. |
| 7,624,416 B1 | 11/2009 | Vandermolen et al. |
| 7,631,327 B2 | 12/2009 | Dempski et al. |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,721,307 B2 | 5/2010 | Hendricks et al. |
| 7,739,596 B2 | 6/2010 | Clarke-Martin et al. |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,800,102 B2 | 9/2010 | Park et al. |
| 7,804,506 B2 | 9/2010 | Bates et al. |
| 7,818,763 B2 | 10/2010 | Sie et al. |
| 7,840,415 B2 | 11/2010 | Schifone |
| 7,870,592 B2 | 1/2011 | Hudson et al. |
| 7,885,951 B1 | 2/2011 | Rothschild |
| 7,899,719 B2 | 3/2011 | Lin-Hendel |
| 7,912,753 B2 | 3/2011 | Struble |
| 7,923,722 B2 | 4/2011 | Ryu et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,122,480 B2 | 2/2012 | Sholtis |
| 8,132,486 B1 | 3/2012 | Calvert |
| 8,141,112 B2 | 3/2012 | Cope et al. |

(56) References Cited

U.S. PATENT DOCUMENTS

| | | |
|---|---|---|
| 8,181,212 B2 | 5/2012 | Sigal |
| 8,196,162 B2 | 6/2012 | Van De Klashorst |
| 8,312,486 B1 | 11/2012 | Briggs et al. |
| 8,341,152 B1 | 12/2012 | Bates |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller et al. |
| 8,549,555 B2 | 10/2013 | Briggs et al. |
| 8,589,984 B1 | 11/2013 | Acharya et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |
| 8,655,146 B2 | 2/2014 | Bennett et al. |
| 8,682,809 B2 | 3/2014 | Avedissian et al. |
| 8,708,223 B2 | 4/2014 | Gates et al. |
| 8,752,083 B2 | 6/2014 | Geer, III et al. |
| 8,769,016 B2 | 7/2014 | Jakobson |
| 8,769,053 B2 | 7/2014 | Spitz et al. |
| 8,769,584 B2 | 7/2014 | Neumeier et al. |
| 8,782,690 B2 | 7/2014 | Briggs et al. |
| 8,813,132 B2 | 8/2014 | Andrews, II et al. |
| 8,893,173 B2 | 11/2014 | Briggs et al. |
| 9,113,214 B2 | 8/2015 | Andrews, II et al. |
| 9,210,472 B2 | 12/2015 | Andrews, II et al. |
| 9,813,770 B2 | 11/2017 | Andrews, II et al. |
| 10,225,614 B2 | 3/2019 | Andrews, II et al. |
| 10,986,412 B2 | 4/2021 | Andrews, II et al. |
| 11,516,551 B2 | 11/2022 | Andrews, II et al. |
| 2002/0016965 A1 | 2/2002 | Tomsen |
| 2002/0059196 A1 | 5/2002 | I'Anson et al. |
| 2002/0062481 A1 | 5/2002 | Slaney et al. |
| 2002/0075332 A1 | 6/2002 | Geilfuss, Jr. et al. |
| 2002/0083447 A1 | 6/2002 | Heron et al. |
| 2002/0083469 A1 | 6/2002 | Jeannin et al. |
| 2002/0126990 A1 | 9/2002 | Rasmussen et al. |
| 2002/0194604 A1 | 12/2002 | Sanchez et al. |
| 2002/0199181 A1 | 12/2002 | Allen |
| 2003/0023490 A1 | 1/2003 | Lenyon et al. |
| 2003/0028873 A1 | 2/2003 | Lemmons |
| 2003/0131357 A1 | 7/2003 | Kim |
| 2003/0135563 A1 | 7/2003 | Bodin et al. |
| 2003/0149983 A1* | 8/2003 | Markel ............ H04N 21/8543 725/51 |
| 2003/0163832 A1 | 8/2003 | Tsuria et al. |
| 2003/0208758 A1 | 11/2003 | Schein et al. |
| 2003/0228615 A1 | 12/2003 | Rossi et al. |
| 2003/0231851 A1 | 12/2003 | Rantala et al. |
| 2004/0003406 A1 | 1/2004 | Billmaier |
| 2004/0021684 A1 | 2/2004 | B. Millner |
| 2005/0022226 A1 | 1/2005 | Ackley et al. |
| 2005/0029514 A1 | 2/2005 | Moriya |
| 2005/0033656 A1 | 2/2005 | Wang et al. |
| 2005/0076372 A1 | 4/2005 | Moore et al. |
| 2005/0229227 A1 | 10/2005 | Rogers |
| 2005/0273830 A1 | 12/2005 | Silver et al. |
| 2006/0009243 A1 | 1/2006 | Dahan et al. |
| 2006/0089843 A1 | 4/2006 | Flather |
| 2006/0136305 A1 | 6/2006 | Fitzsimmons et al. |
| 2006/0202191 A1 | 9/2006 | Gerlach et al. |
| 2006/0242016 A1 | 10/2006 | Chenard |
| 2006/0256133 A1 | 11/2006 | Rosenberg |
| 2006/0265657 A1 | 11/2006 | Gilley |
| 2006/0276266 A1 | 12/2006 | Sullivan |
| 2007/0043713 A1 | 2/2007 | Elmi et al. |
| 2007/0087489 A1 | 4/2007 | Park et al. |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0199022 A1 | 8/2007 | Moshiri et al. |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0250901 A1 | 10/2007 | McIntire et al. |
| 2007/0266399 A1 | 11/2007 | Sidi |
| 2007/0271149 A1 | 11/2007 | Siegel et al. |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0065990 A1 | 3/2008 | Harrison et al. |
| 2008/0066099 A1 | 3/2008 | Brodersen et al. |
| 2008/0066107 A1 | 3/2008 | Moonka et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0177627 A1 | 7/2008 | Cefail |
| 2008/0177630 A1 | 7/2008 | Maghfourian et al. |
| 2008/0235085 A1 | 9/2008 | Kovinsky et al. |
| 2008/0250445 A1 | 10/2008 | Zigmond et al. |
| 2008/0253739 A1 | 10/2008 | Livesey |
| 2008/0255934 A1 | 10/2008 | Leventhal et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0296568 A1 | 12/2008 | Ryu et al. |
| 2008/0306999 A1 | 12/2008 | Finger et al. |
| 2008/0307310 A1 | 12/2008 | Segal et al. |
| 2008/0319852 A1 | 12/2008 | Gardner et al. |
| 2008/0319856 A1 | 12/2008 | Zito et al. |
| 2009/0007023 A1* | 1/2009 | Sundstrom ......... H04N 21/8583 715/858 |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032809 A1 | 2/2009 | Kim et al. |
| 2009/0043674 A1 | 2/2009 | Minsky et al. |
| 2009/0077598 A1 | 3/2009 | Watson et al. |
| 2009/0083815 A1 | 3/2009 | McMaster et al. |
| 2009/0094339 A1 | 4/2009 | Allen et al. |
| 2009/0119169 A1 | 5/2009 | Chandratillake et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhnke et al. |
| 2009/0265255 A1 | 10/2009 | Jackson et al. |
| 2009/0276805 A1 | 11/2009 | Andrews, II et al. |
| 2009/0307092 A1 | 12/2009 | Gugliuzza et al. |
| 2009/0320073 A1 | 12/2009 | Reisman |
| 2010/0005139 A1 | 1/2010 | Lanahan et al. |
| 2010/0030578 A1 | 2/2010 | Siddique et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0223107 A1 | 9/2010 | Kim et al. |
| 2010/0247061 A1 | 9/2010 | Bennett et al. |
| 2010/0257448 A1 | 10/2010 | Squires |
| 2010/0279766 A1 | 11/2010 | Pliska et al. |
| 2010/0283827 A1 | 11/2010 | Bustamente |
| 2010/0287580 A1 | 11/2010 | Harding et al. |
| 2010/0299616 A1 | 11/2010 | Chen et al. |
| 2010/0306805 A1 | 12/2010 | Neumeier et al. |
| 2010/0332329 A1 | 12/2010 | Roberts et al. |
| 2011/0004517 A1 | 1/2011 | Soto et al. |
| 2011/0052144 A1 | 3/2011 | Abbas et al. |
| 2011/0071865 A1 | 3/2011 | Leeds et al. |
| 2011/0133176 A1 | 6/2011 | Lee et al. |
| 2011/0173300 A1 | 7/2011 | Levy et al. |
| 2011/0191809 A1 | 8/2011 | Briggs et al. |
| 2011/0216087 A1 | 9/2011 | Gritton et al. |
| 2011/0231260 A1 | 9/2011 | Price |

(56) References Cited

U.S. PATENT DOCUMENTS

| | | |
|---|---|---|
| 2011/0238755 A1 | 9/2011 | Khan et al. |
| 2011/0251897 A1 | 10/2011 | Litvack et al. |
| 2011/0307397 A1 | 12/2011 | Benmbarek |
| 2012/0030704 A1 | 2/2012 | Schiller et al. |
| 2012/0079021 A1 | 3/2012 | Roman et al. |
| 2012/0158511 A1 | 6/2012 | Lucero et al. |
| 2012/0185355 A1 | 7/2012 | Kilroy |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0296738 A1 | 11/2012 | Leeder |
| 2012/0296782 A1 | 11/2012 | Tsai et al. |
| 2012/0304065 A1 | 11/2012 | Cai |
| 2013/0014137 A1 | 1/2013 | Bhatia et al. |
| 2013/0054757 A1 | 2/2013 | Spitz et al. |
| 2013/0110608 A1 | 5/2013 | Cassidy et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0166382 A1 | 6/2013 | Cassidy et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0290550 A1 | 10/2013 | Bangalore et al. |
| 2014/0019860 A1 | 1/2014 | Sathish et al. |
| 2014/0032366 A1 | 1/2014 | Spitz et al. |
| 2014/0095330 A1 | 4/2014 | Briggs et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |
| 2015/0319501 A1 | 11/2015 | Andrews, II et al. |
| 2018/0249217 A1 | 8/2018 | Andrews, II et al. |
| 2020/0014980 A1 | 1/2020 | Andrews, II et al. |
| 2021/0392404 A1 | 12/2021 | Andrews, II et al. |

FOREIGN PATENT DOCUMENTS

| | | |
|---|---|---|
| WO | WO-2008016634 A2 | 2/2008 |
| WO | WO-2009012580 A1 | 1/2009 |
| WO | WO-2009137368 A2 | 11/2009 |
| WO | WO-2011149491 A1 | 12/2011 |
| WO | WO-2013033239 A1 | 3/2013 |
| WO | WO-2013192557 A2 | 12/2013 |
| WO | WO-2015013117 A1 | 1/2015 |
| WO | WO-2015038795 A1 | 3/2015 |
| WO | WO-2015038798 A1 | 3/2015 |
| WO | WO-2015038802 A1 | 3/2015 |
| WO | WO-2015048375 A1 | 4/2015 |
| WO | WO-2015048377 A1 | 4/2015 |
| WO | WO-2015054644 A1 | 4/2015 |

OTHER PUBLICATIONS

"About Rich Media Guidelines Compliance: Over-the-Page Units," Jan. 7, 2007, 2 pages.
"Akamai for Media & Entertainment," Akamai Technologies, Inc., 2007, 38 pages.
"Broadband Ad Creative Guidelines," Dec. 31, 2006, 3 pages.
Bullas, J., "How Zappos Plans To Use 50,000 Online Videos," dated Dec. 8, 2009, retrieved online at https://www.jeffbullas.com/how-zappos-plans-to-use-50000-online-videos/, pp. 1-2.
"Content distributors can shopping-enable video content," www.web.archive.org, Apr. 27, 2007, 1 page.
"DART Motif for In-Stream Helps Publishers Improve Efficiency, Push the Envelope with Video Ad Effects and Offer Advertisers Trusted, Reliable Reporting Metrics," Nov. 6, 2006, 3 pages.
"Digital Video Ad Serving Template (VAST), Version 2.0," iab., Nov. 2009, 16 pages.
"Digital Video Ad Serving Template (VAST), Version 2.0," iab., Nov. 2009, 18 pages (Redlined).
"Digital Video In-Stream Ad Format Guidelines and Best Practices," Interactive Advertising Bureau, May 2008, 17 pages.
"DoubleClick Debuts Video Ad-Serving Solution," Nov. 6, 2006, 2 pages.
"ebd Web Video Player, Increase Online Video Ad Monetization," www.ebdsoft.tv, 2010, 2 pages.
"Final Broadband Ad Creative Guidelines," Interactive Advertising Bureau, Standards & Guidelines, 4 pages.
Foster, J., "Engaging Shoppers With Interactive Video—10 Examples Shared," retrieved from the internet on Mar. 3, 2015, 4 pages, http://videocommerce.com/blog/engaging-shoppers-with-interactive-video-examples.
Gannes, L., "YouTube's New Inline Ads: Screenshots," May 11, 2007, 7 pages.
Helft, M., "Google Aims to Make YouTube Profitable With Ads," The New York Times, Aug. 22, 2007, 3 pages.
"Shopisodes Enable You to Dress Like Your Favorite TV Character," www.web.archive.org, Oct. 26, 2007, 1 page.
"IAB Announces Advertising Creative Guidelines for Online Broadband Video Commercials," Nov. 29, 2005, 4 pages.
International Search Report and Written Opinion for International Application No. PCT/US2009/042617, mailed Nov. 30, 2009, 9 pages.
International Search Report and Written Opinion for International Application No. PCT/US2010/057567, mailed Jun. 24, 2011, 9 pages.
International Search Report and Written Opinion for International Application No. PCT/US2012/052897, mailed Nov. 14, 2012, 6 pages.
International Search Report and Written Opinion for International Application No. PCT/US2013/047124, mailed Jan. 10, 2014, 6 pages.
International Search Report and Written Opinion for International Application No. PCT/US2014/055226, mailed Dec. 16, 2014, 6 pages.
International Search Report and Written Opinion for International Application No. PCT/US2014/055229, mailed Dec. 16, 2014, 6 pages.
International Search Report and Written Opinion for International Application No. PCT/US2014/055233, mailed Nov. 24, 2014, 5 pages.
International Search Report and Written Opinion for International Application No. PCT/US2014/057595, mailed Dec. 15, 2014, 5 pages.
International Search Report and Written Opinion for International Application No. PCT/US2014/057597, mailed Jan. 9, 2015, 6 pages.
International Search Report and Written Opinion for International Application No. PCT/US2014/060150, mailed Jan. 26, 2015, 6 pages.
International Search Report and Written Opinion for International Application No. PCT/US2015/018140, mailed Jun. 3, 2015, 9 pages.
Kaplan, D., "Delivery Agent lets you buy products in your favorite TV shows," www.web.archive.org, May 4, 2007, 4 pages.
Krikke, J., "Streaming Video Transforms the Media Industry," IEEE, Jul./Aug. 2004, p. 6-12.
Liebman, J., "Reality TV That's Social, Bravo!," www.web.archive.org, Dec. 22, 2008, 6 pages.
Mei, T. et al., "VideoSense—Towards Effective Online Video Advertising," Sep. 23-28, 2007, p. 1075-1084.
Non-Final Office Action for U.S. Appl. No. 17/210,045, dated Dec. 3, 2021, 9 pages.
Notification on Results of Estimation of Patentability of Invention for Russian Application No. 2012105917, dated Feb. 16, 2015, 7 pages.

(56) References Cited

OTHER PUBLICATIONS

Office Action for U.S. Appl. No. 12/363,713, mailed Jun. 13, 2012, 13 pages.
Office Action for U.S. Appl. No. 12/363,713, mailed Oct. 3, 2011, 9 pages.
Office Action for U.S. Appl. No. 12/434,569, mailed Jul. 18, 2013, 9 pages.
Office Action for U.S. Appl. No. 12/434,569, mailed Mar. 15, 2013, 8 pages.
Office Action for U.S. Appl. No. 12/434,569, mailed Mar. 20, 2014, 10 pages.
Office Action for U.S. Appl. No. 12/434,569, mailed Mar. 4, 2012, 6 pages.
Office Action for U.S. Appl. No. 12/434,569, mailed Nov. 19, 2013, 11 pages.
Office Action for U.S. Appl. No. 12/434,569, mailed Oct. 2, 2014, 10 pages.
Office Action for U.S. Appl. No. 12/434,569, mailed Oct. 25, 2012, 9 pages.
Office Action for U.S. Appl. No. 12/787,505, mailed Apr. 5, 2012, 16 pages.
Office Action for U.S. Appl. No. 12/787,505, mailed Aug. 27, 2014, 12 pages.
Office Action for U.S. Appl. No. 12/787,505, mailed Mar. 1, 2013, 10 pages.
Office Action for U.S. Appl. No. 12/787,505, mailed Mar. 18, 2014, 10 pages.
Office Action for U.S. Appl. No. 12/787,505, mailed Oct. 24, 2012, 9 pages.
Office Action for U.S. Appl. No. 12/787,505, mailed Sep. 23, 2013, 10 pages.
Office Action for U.S. Appl. No. 13/531,402, mailed Dec. 6, 2013, 13 pages.
Office Action for U.S. Appl. No. 13/531,402, mailed Feb. 27, 2014, 15 pages.
Office Action for U.S. Appl. No. 13/753,384, mailed Dec. 20, 2013, 10 pages.
Office Action for U.S. Appl. No. 13/753,384, mailed Jul. 9, 2014, 9 pages.
Office Action for U.S. Appl. No. 13/753,384, mailed May 17, 2013, 9 pages.
Office Action for U.S. Appl. No. 13/753,384, mailed Oct. 25, 2013, 14 pages.
Office Action for U.S. Appl. No. 13/923,089, mailed Aug. 20, 2014, 10 pages.
Office Action for U.S. Appl. No. 13/923,089, mailed Dec. 2, 2014, 5 pages.
Office Action for U.S. Appl. No. 14/042,477, mailed Apr. 10, 2014, 9 pages.
Office Action for U.S. Appl. No. 14/079,385, mailed Aug. 27, 2014, 12 pages.
Office Action for U.S. Appl. No. 14/079,385, mailed Feb. 21, 2014, 10 pages.
Office Action for U.S. Appl. No. 14/079,385, mailed Jul. 1, 2015, 13 pages.
Office Action for U.S. Appl. No. 14/079,385, mailed Mar. 3, 2015, 12 pages.
Office Action for U.S. Appl. No. 14/091,219, mailed Apr. 11, 2014, 9 pages.
Office Action for U.S. Appl. No. 14/091,219, mailed Jul. 21, 2014, 11 pages.
Office Action for U.S. Appl. No. 14/292,423, mailed Jan. 9, 2015, 13 pages.
Office Action for U.S. Appl. No. 14/461,570, mailed Jun. 23, 2016, 22 pages.
Office Action for U.S. Appl. No. 14/461,570, mailed Oct. 7, 2015, 8 pages.
Office Action for U.S. Appl. No. 14/484,047, mailed Dec. 18, 2014, 7 pages.
Office Action for U.S. Appl. No. 14/484,047, mailed May 18, 2015, 9 pages.
Office Action for U.S. Appl. No. 14/484,065, mailed Dec. 19, 2014, 7 pages.
Office Action for U.S. Appl. No. 14/484,225, mailed Dec. 26, 2014, 7 pages.
Office Action for U.S. Appl. No. 14/484,225, mailed May 21, 2015, 12 pages.
Office Action for U.S. Appl. No. 14/497,686, mailed Feb. 24, 2015, 13 pages.
Office Action for U.S. Appl. No. 14/498,800, mailed Mar. 27, 2015, 18 pages.
Office Action for U.S. Appl. No. 14/512,204, mailed Jan. 6, 2015, 17 pages.
Office Action for U.S. Appl. No. 14/800,581, mailed Feb. 20, 2018, 10 pages.
Office Action for U.S. Appl. No. 14/800,581, mailed Jun. 2, 2017, 9 pages.
Office Action for U.S. Appl. No. 14/800,581, mailed Mar. 9, 2016, 7 pages.
Office Action for U.S. Appl. No. 14/800,581, mailed Oct. 15, 2015, 5 pages.
Office Action for U.S. Appl. No. 15/722,555, mailed Jul. 6, 2018, 11 pages.
Office Action for U.S. Appl. No. 16/268,956, mailed Apr. 20, 2020, 18 pages.
Reid, F. et al., "An Analysis of Anonymity in the Bitcoin System," Cha. 1 (online), URL: https://arxiv.org/pdf/1107.4524.pdf, May 7, 2012, 29 pages.
Rich Media Guidelines: Fall 2004, Dec. 31, 2006, 3 pages.
Skidgel, J., "Producing Flash CS3 Video, Techniques for Video Pros and Web Designers," 2007, 9 pages.
Tomlinson, C., "Google Tries to Relive Past Glories by Making YouTube PPay for Itself," Birmingham Post, Sep. 4, 2007, 3 pages.
Van Vilet, H., "Where Television and Internet Meet . . . New Experiences for Rich Media," E-VIEW 02-1, Jan. 2002, 35 pages.
Wan, K. et al., "Advertising Insertion in Sports Webcasts", Apr.-Jun. 2007 IEEE, pp. 78-82.

* cited by examiner

```
<!--
item 1 = Motorbike
item 2 = T-shirt
item 3 = Cap
-->
<websites>      402                              404
<site url = " javascript : slideFoilo(1) ; " caption= "Motorbike"
<site url = " javascript : slideFoilo(2) ; " caption= "T-shirt "
<site url = " javascript : slideFoilo(3) ; " caption= " Cap"
        •
        •
        •
</websites>
```

*FIG. 7*

```
var x : XML = new XML ( ) ;
// ignore white spaces in XML document
x. ignorWhite = true;
// create array for storing urls for photos
var urls : Array = new Array;
// create array for storing captions
var captions : Array = new Array;
var whoIsOn : Number;
// make an item variable
_global . product
//
x . onLoad = function ( ) {
    // array variable to store all photo elements
    var photos : Array = this . firstChild . childNodes;
    for(i =0; i<photos. length; i ++) {
        urls . push (photos [ i ] . attributes . url );
        captions . push (photos [ i ] . attributes . caption );
    }
    holder . loadMovie(urls[0]);
    caption . text = captions[0];
    whoIsOn = 0;
    item = urls[0];
}
x . load ( " websites . xml " )
onRollOver = function ( ) {               ─── 502
    _ root . textbox = captions[1];
    showPopup
};
onRollOut = function ( ) {                ─── 504
    _root .textbox = "" ;
    hidePopup( );
} ;
onRelease = function( ){                  ─── 506
    get URL(urls[0]) ;
};
```

—cart >> checkout >> receipt

🔒 safe ✓ easy ⊕ fast

Cancel and Continue Shopping step 1: your email / password

Please enter your email address / password:

Email: _____ — 704

Password: _____ — 706

>>Continue

702

| item | quantity | price |
|------|----------|-------|
| Motorbike | 1 | $1000.00 |
| | Subtotal: | $1000.00 |
| | Shipping & Handling: | $0.00 |
| | Tax: | $0.00 |
| | Order total: | $1000.00 |

METHOD AND SYSTEM FOR GENERATION AND PLAYBACK OF SUPPLEMENTED VIDEOS

RELATED APPLICATIONS

The present application is a continuation of U.S. patent application Ser. No. 17/210,045, filed Mar. 23, 2021, which is a continuation of U.S. patent application Ser. No. 16/268,956, filed Feb. 6, 2019, now U.S. Pat. No. 10,986,412, which is a continuation of U.S. patent application Ser. No. 14/800,581, filed Jul. 15, 2015, now U.S. Pat. No. 10,225,614, which in turn is a continuation of U.S. patent application Ser. No. 13/753,384, filed Jan. 29, 2013, now U.S. Pat. No. 9,210,472, which in turn is a continuation of U.S. patent application Ser. No. 12/434,569, filed May 1, 2009, now U.S. Pat. No. 9,113,214, which in turn claims the benefit of U.S. Provisional Patent Application No. 61/050,206 entitled "HOT CLICK VIDEO" filed May 3, 2008; the entirety of each of the aforementioned applications is expressly incorporated by reference herein.

FIELD

The present invention relates to the supplementation of videos, and more particularly, to a method and system for generation and playback of supplemented videos.

RELATED ART

Modern consumers are becoming progressively more sophisticated. As a result, individuals and companies attempting to generate interest and sales in their products are relying upon very specific target marketing to attract their desired target customers. Similarly, customers are demanding more exciting and entertaining sales methods from individuals and companies selling products. In addition, advertising has begun to be delivered on an ever-expanding number of platforms. Both individuals and companies attempting to sell products and consumers looking for more entertaining advertisements and more convenience in viewing such advertisements are finding that point of interaction devices (which will be described later) are becoming an attractive vehicle to deliver and view such advertisements and conduct business.

SUMMARY

Video files, whether delivered to a television, computer, or a mobile device, currently allow a potential customer to view an object in the video file for purchase or receive more information. Interacting with the video files, however, can often stop the playback of the video file. In certain cases, the video file may become unstable or crash. From the potential customer's perspective, this interruption to the playback of the video file can be frustrating. When the playback of the video file is restored, the potential customer may not want or remember to purchase the object in the video file. Furthermore, the potential customer may not even resume playback of the video file. This can result in lost sales of the object in the video file.

The video files may also contain incorrect or obsolete information so that when the potential customer attempts to purchase the object, the object is not the object that the user wanted to purchase or the object is out-of-stock. In such cases, the potential customer may not only refrain from purchasing the object, but also have a strong resentment towards the merchant selling the product and/or the video producer.

To correct errors in the video files or update the video files, a video producer will have to re-generate the video including the interactive features. However, such a process is usually cumbersome and cost-prohibitive. Thus, the video producer may only be able to make few corrections and/or provide few updates to the video files. Such options are undesirable since incorrect information or other problems with the video file may reduce a popularity of the video file. This can impact any advertisement revenues the distributor receives from the video file. From a merchant's perspective, the foregoing events are problematic since it wants to sell the objects and any loss of sales can impact the commercial viability of the merchant.

Furthermore, current data collection methods and systems are inadequate for determining viewer demographics of the video file and/or a popularity of the objects located within the video file.

Thus, there is a need for a more efficient method and system for generation and playback of supplemented videos which include interactive features.

The present invention is a method and system for generation and playback of supplemented videos which include interactive features. The supplemented video includes hotspots which allow a video viewer to interact with the video when the video viewer sees an object. The object in the supplemented video can be an object that the video viewer would like to know more information about or purchase. This allows for the video viewer to purchase or learn more about objects while the supplemented video is playing instead of waiting until the supplemented video has completed playback. The hotspots can be manually defined frame by frame.

Information regarding the object and the hotspot can be stored in a separate XML file, reducing the size of the supplemented video. The separate XML file allows the video producer to produce multiple interactive versions of the supplemented video and customize the supplemented video to the video viewer without re-generating the supplemented video. Furthermore, the separate XML file allows the video producer to correct any mistakes to the interactive information regarding the object or update the interactive information regarding the object.

The separate XML file also allows an appropriate advertisement or video advertisement to easily be found corresponding to one or more of the hotspots in the supplemented video. Since the XML file can be updated to reflect the latest information regarding the object, the advertisements can be customized to better target a desired audience.

Furthermore, the present invention can be a marketplace where a desired object can be found by searching the XML file. The search results can list the supplemented videos which contain hotspots corresponding to the object and also the time in the supplemented video in which the object is found. This can allow the video viewer to more easily find the supplemented videos with objects that he is interested in.

The present invention can also aggregate data about the objects based on the playback of the supplemented videos and the video viewer's interaction with the supplemented videos. This can provide a better understanding of a popularity of an object and allow for better marketing and/or branding strategy by the object producer and/or seller.

In one embodiment, the present invention is a method for generating a second video file including receiving a first video file, receiving a definition of a hotspot, receiving caption information corresponding to the hotspot, storing the caption information in a first data storage area, adding the definition of the hotspot to the first video file to create a second video file, and storing the second video file in a second data storage area.

In one embodiment, the present invention is a method for displaying a video including displaying the video in a display, where the video includes a hotspot. The present invention also includes detecting an action on the hotspot, accessing a first data storage area, wherein the first data storage area is separate from the video and the first data storage area includes hotspot information corresponding to the hotspot, and displaying the hotspot information on the display.

In one embodiment, the present invention is a method for generating a video widget including accessing a video file, wherein the video file includes a hotspot, accessing a first data storage area, wherein the first data storage area is separate from the video file and the first data storage area includes a hotspot information corresponding to the hotspot, and adding the hotspot information to the video file to create a video widget which can display the hotspot information.

In one embodiment, the present invention is a method for generating a revenue report including displaying a video, detecting an action of a hotspot in the video, incrementing an action count when the action is detected, and generating the revenue report based on the action count.

In one embodiment, the present invention is a method for displaying advertisements in a video including analyzing a hotspot information corresponding to a hotspot in a first data storage area separate from a video including the hotspot to determine an advertisement corresponding to the hotspot, displaying the video, and displaying the advertisement corresponding to the hotspot when the hotspot appears in the video.

In one embodiment, the present invention is a computer implemented method for displaying advertisements in a video including analyzing hotspot information corresponding to a plurality of hotspots in a first data storage area separate from a video including the plurality of hotspots to determine an advertisement to be displayed, displaying the advertisement, and displaying the video after the advertisement is displayed.

In one embodiment, the present invention is an electronic marketplace system including a processor, a search unit connected to the processor to search for videos including hotspots, and a memory unit connected to the processor and the search unit, the memory unit storing the videos including hotspots.

In one embodiment, the present invention is a method for providing a list of videos including receiving, by a search unit, a search query associated with an object, performing, using the search unit, a search based on the search query to identify videos including hotspots and associated with the object, and providing, using the search unit, the list of the videos including hotspots and associated with the object.

BRIEF DESCRIPTION OF THE DRAWINGS

The features, objects, and advantages of the present invention will become more apparent from the detailed description set forth below when taken in conjunction with the drawings, wherein:

FIG. 7 is an XML file according to an embodiment of the present invention;

FIG. 8 is an action script according to an embodiment of the present invention;

FIG. 15 is a screen shot of a playback of a supplemented video according to an embodiment of the present invention;

DETAILED DESCRIPTION

Figure 1:
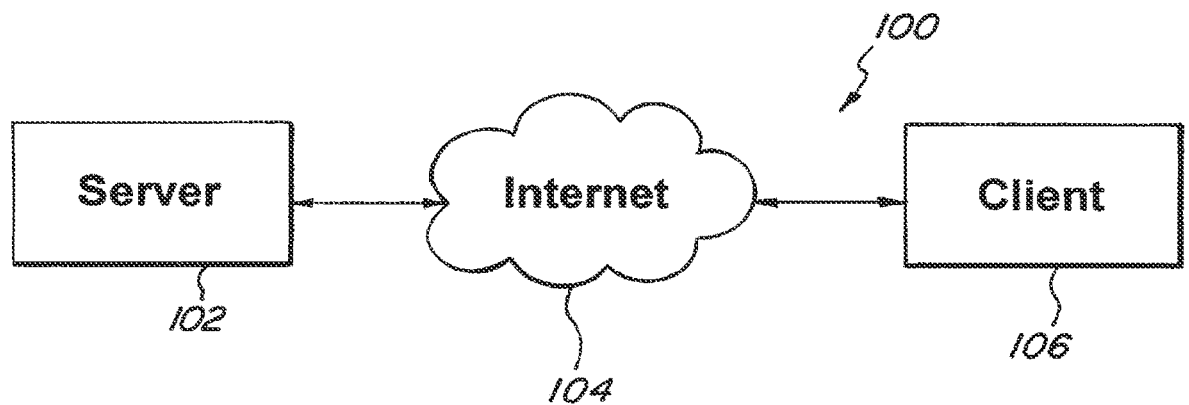
FIG. 1 is a box diagram of a system used in the present invention.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, a user computer may include an operating system (e.g., Windows NT, 95/98/2000, CE, Mobile, XP, Vista, OS2, UNIX, Linux, Solaris, MacOS, etc.) as well as various conventional support software and drivers typically associated with computers. A user may include any individual, business, entity, government organization, software and/or hardware that interact with a system. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000, CE, Mobile, XP, Vista, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILP NAIK, INTERNET STANDARDS AND PROTOCOLS (1998); JAVA 2 COMPLEE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form The system contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armenk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB), stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a Web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable Web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium.

Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, Web pages, Web sites, Web forms, prompts, etc. Practitioners will appreciate that the illustrated steps described herein may comprise in any number of configurations including the use of windows, Web pages, Web forms, popup windows, prompts and the like. It should be further appreciated that the multiple steps as illustrated and described may be combined into single Web pages and/or windows but have been expanded for the sake of simplicity. In other cases, steps illustrated and described as single process steps may be separated into multiple Web pages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The present invention is directed towards the generation and playback of supplemented videos including hotspots. The present invention is beneficial to video producers, video viewers, and third parties such as sellers and/or producers of objects in the supplemented videos. The present invention allows video producers to produce supplemented videos which are interactive, updated, and customizable. The present invention also allows video viewers to interact with the supplemented videos or find supplemented videos including objects of interest. The video viewers can easily learn more about or purchase the objects in the supplemented videos in a convenient and simple manner without waiting for the supplemented video to finish playing. Furthermore, the present invention allows third parties such as sellers and/or producers of the objects in the supplemented videos, to sell the objects, provide advertisements, market the objects, gain data regarding the objects, and/or perform other functionality related to the object. The features, advantages, and benefits of the present invention will be more fully described below.

As seen in FIG. 1, the present invention can be embodied in a system 100. The system 100 includes one or more servers 102 and one or more clients 106. The servers 102 and the clients 106 can be connected, for example, by the Internet 104. The servers 102 and/or the clients 106 can be, for example, a computer, a mobile phone, a Blackberry®, an iPhone®, a personal digital assistant, or a laptop.

Figure 2:
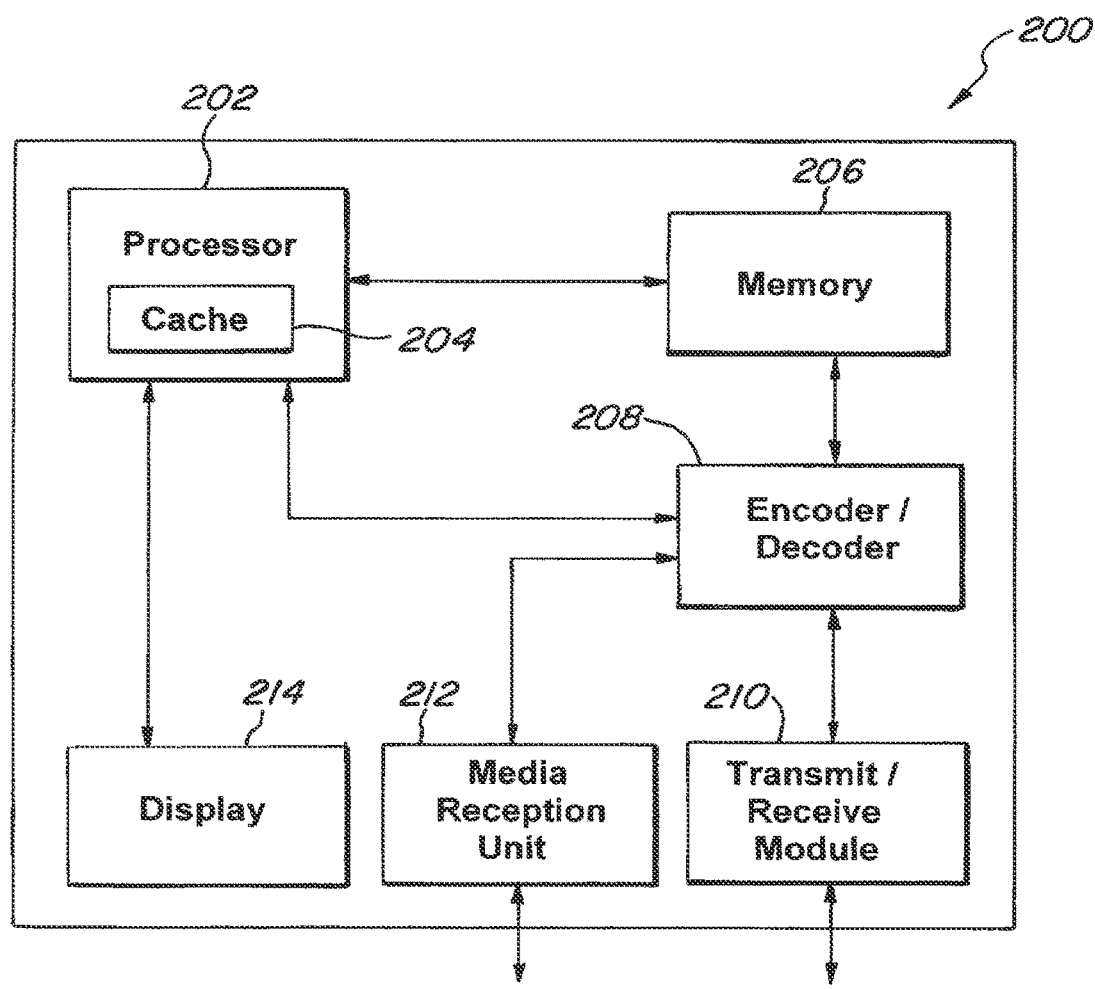
FIG. 2 is a box diagram of an electronic device used in the present invention.

Both the servers 102 and/or the clients 106 can each be embodied as an electronic device 200 as shown in FIG. 2. A processor 202 is connected to a memory 206, an encoder/decoder 208, and a display 214. The processor 202 can perform video processing, data processing, or any other tasks related to video or data processing. The processor 202 can include a cache 204. The cache 204 can be used to store video files, data related to the video files, or any other data that is related to video processing or data processing. The memory 206 is connected to the processor 202 and the encoder/decoder 208. The memory 206 can store video files, data related to the video files, or any other data that is related to video processing or data processing.

In one embodiment, the encoder/decoder 208 is connected to the memory 206, the processor 202, a transmit/receive module 210, and a media reception unit 212. The encoder/decoder 208 can receive data from the transmit/receive module 210 or the media reception unit 212, decode the data, and store the decoded data in the memory 206. The encoder/decoder 208 can also encode data from the memory 206 and transmit the encoded data to the transmit/receive module 210 and/or the media reception unit 212.

The transmit/receive module 210 is connected to the encoder/decoder 208. The transmit/receive module 210 transmits and/or receives data including, for example, encoded data. The client 106 and the server 102 can communicate with each other using the transmit/receive module 210. The media reception unit 212 is connected to the encoder/decoder 208. The media reception unit 212 can accept a machine readable medium with software encoded on it such as a compact disc, digital versatile disc (DVD), universal serial bus (USB) flash drive, or any other type of medium which can be read by a machine. The display 214 is connected to the processor 202 and can display, for example, videos, information relating to the videos, or any other types of image.

Likewise, the electronic device 200 need not be embodied on a single server 102 or a single client 106. For example, the processor 202 and the memory 206 can the processor 202 in the client 106 and the memory in the client 106. However, the processor 202 and the memory 206 can also be the processor in the server 102 and the memory 206 in the client 106.

The present invention can also be embodied on a machine readable medium, a computer readable medium, or any other type of storage device which store a program and/or software which when executed, can cause a processor, a computer, a system, or other electronic device to perform certain functions.

Figure 3:
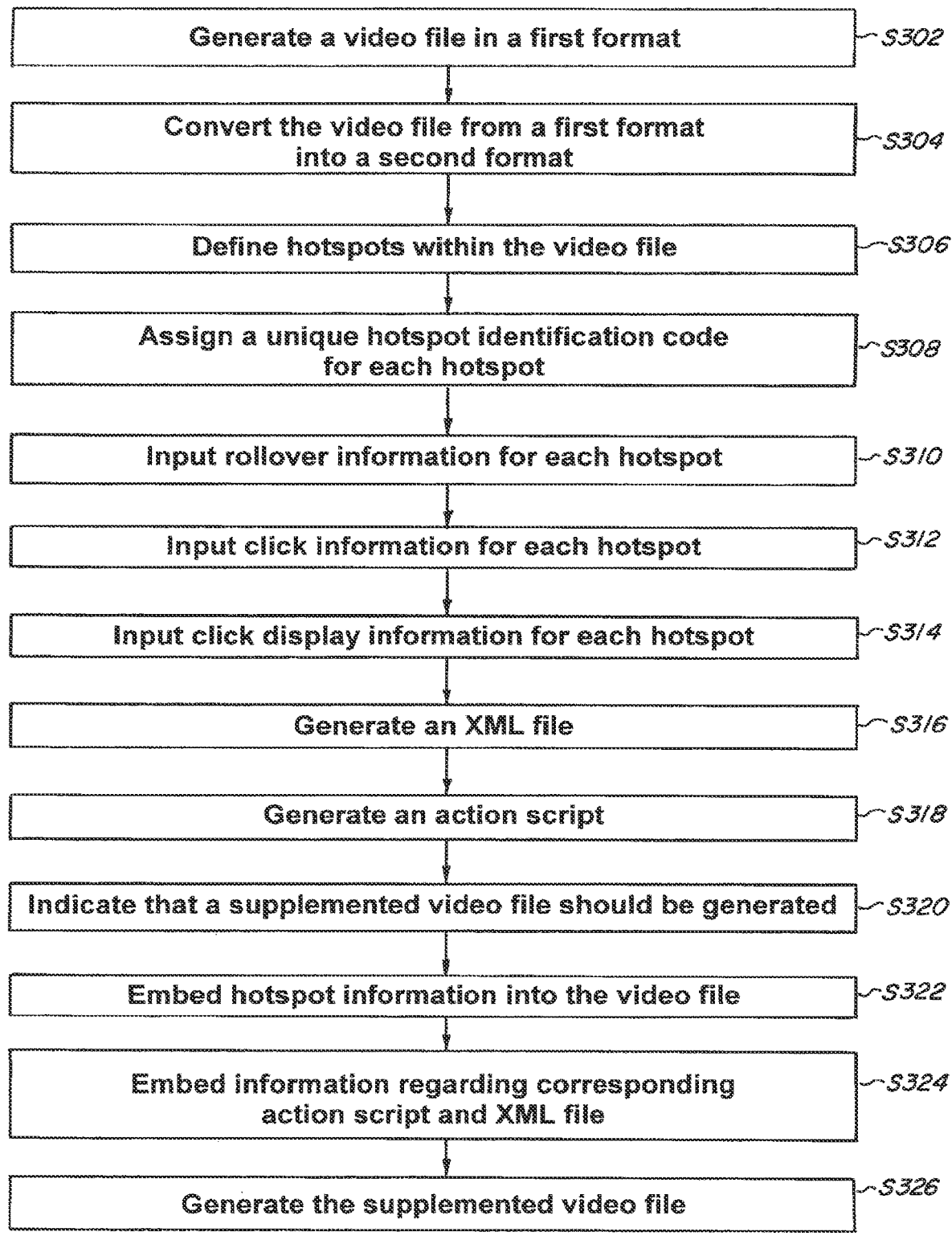
FIG. 3 is a flowchart of a method for producing a supplemented video according to an embodiment of the present invention.

In one embodiment, the present invention generates a supplemented video with an XML file and/or an action script separate from the supplemented video as shown in FIG. 3. For example, the XML file can be located in a first data storage area, the action script can be located in a second data storage area, and the supplemented video can be located in a third data storage area. The separation of the supplemented video and the XML file and/or the action script allows a video producer to edit the features of the supplemented video without re-generating the supplemented video as will be shown below.

In Step S302, the video producer generates a video file in a first format and loads the video file into the memory 206. The video producer can, for example, be an owner of the video file, an agent of the owner, or any other person with access to the video file. The video producer can also be an original video producer, or a video producer subsequent to the original video producer. In Step S304, the processor 202 converts the video file from a first format to a second format by accessing the video file in the memory 206 and optionally using the cache 204 in the processor 202. The second format is any format capable of playing a supplemented video. The supplemented video can be a video including hotspots. The second format, for example, can be a flash video format.

Figure 4:
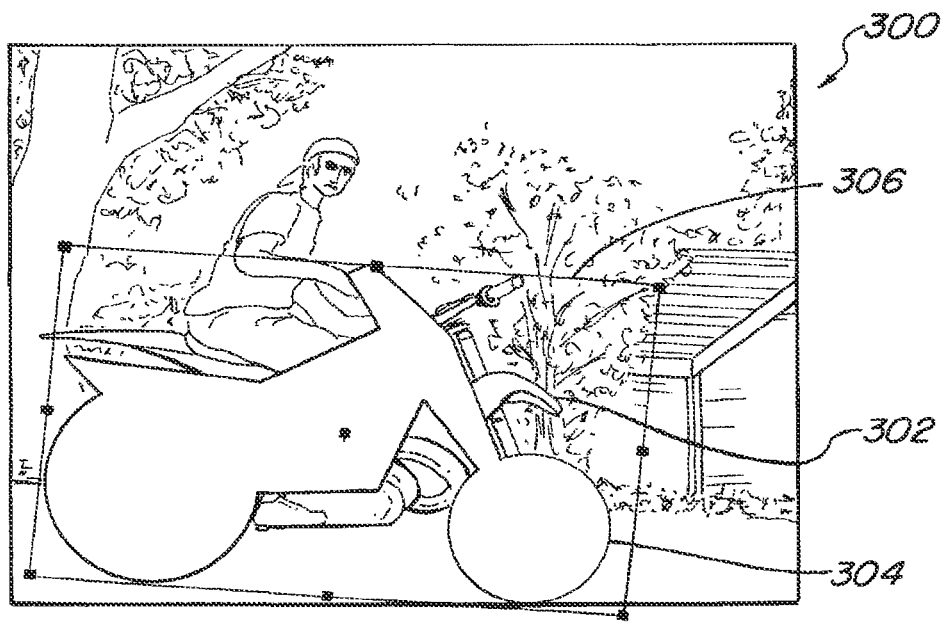
FIG. 4 is a screen shot of a video file that is being tagged with a hotspot according to an embodiment of the present invention.

In Step S306, the video producer defines hotspots within the video file in the second format. A hotspot corresponds to both a location and time of an object displayed in the supplemented video that is generated. This can be seen in FIGS. 4-6. In FIG. 4, the video file 300 in the second format, which will become the supplemented video, is shown. The video producer defines a motorbike 302 as part of a hotspot 304 in a first time period. Although the hotspot 304 is visible to the video producer during the creation of the supplemented video as seen by the shading in FIG. 4, when the supplemented video is played back, the hotspot can be active, but invisible to the video viewer. That is, while the video viewer cannot see the precise location of the hotspot 304, if the video viewer places his cursor over the hotspot 304, a rollover will be detected. The cursor can be, for example, a mouse cursor, a placement of an object on a touch screen, a touchpad, a keystroke pointer, or any other type of method or apparatus which allows an indication to be displayed on the display 214. The rollover corresponds to the cursor being placed over a predefined location in the display 214. In the present invention, the cursor is a mouse cursor and the rollover is a mouse rollover. Instructions for the situations regarding a detection of a mouse rollover will be discussed further below.

Figure 5:
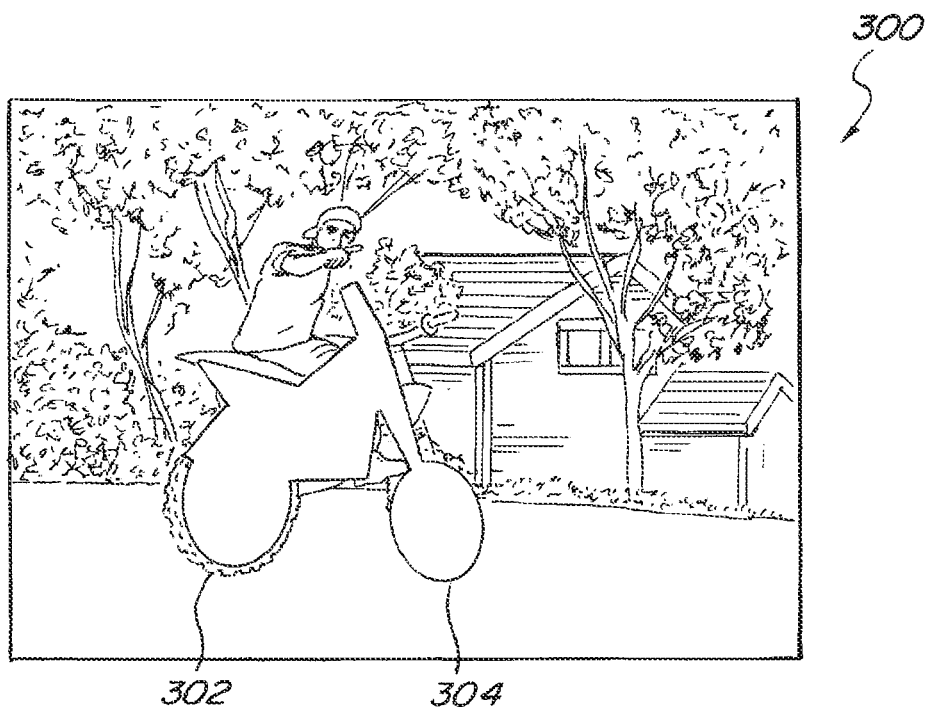
FIG. 5 is a screen shot of a video file that is being tagged with a hotspot according to an embodiment of the present invention.
Figure 6:
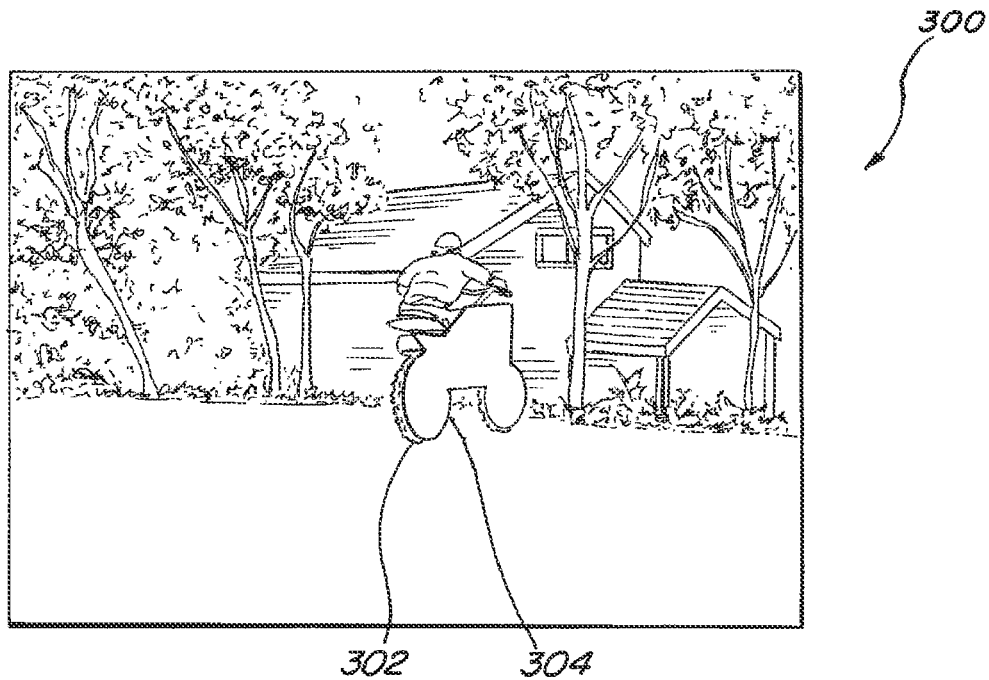
FIG. 6 is a screen shot of a video file that is being tagged with a hotspot according to an embodiment of the present invention.

The dimensions of the hotspot 304 can be adjusted using a hotspot definition tool 306. The dimensions can be, for example, a size and shape of the hotspot 304. As seen in FIG. 4 the hotspot 304 roughly approximates the shape of the motorbike 302. As seen in FIGS. 5 and 6, the hotspot 304 tracks the movement of the motorbike 302 at a second time period and a third time period, respectively. This can be accomplished, for example, by defining the location of the object, such as the motorbike 302, in each frame of the video. Although only a single hotspot 304 is defined for the shape of the motorbike 302, multiple hotspots can defined for the shape of the motorbike 302. For example, the shape of the motorbike can be divided into a back section where the back wheel is located, a middle section where the body of the motorbike is located, and a front section where the front wheel is located. The back section can be used for a first hotspot, the middle section can be used for a second hotspot, and the front section can be used for a third hotspot. Thus, a single motorcycle shape can be used for three separate hotspots. Conversely, two of the sections can correspond to a single hotspot while the other section can correspond to a different hotspot. This allows the video producer to further customize the hotspots covering the motorbike 302 so that a portion of the motorbike or all of the motorbike can correspond to one or more hotspots.

The hotspot definition tool 306 can be custom defined by the video producer such as in FIG. 4. However, the hotspot definition tool 306 can also be completely or partially predefined. For example, the hotspot definition tool 306 can selected from a variety of predefined shapes which approximate a shape of the object such as a square, a circle, a triangle, a predefined motorbike shape, a predefined T-shirt shape, a predefined hat shape, a predefined pants shape, a predefined shoe shape, etc. The video producer can then use the predefined shape for the hotspot definition tool 306 to define the location of the object as part of a hotspot in the video file 300. The video producer can also select the predefined shape and then alter the predefined shape to fit the object to be tagged either by increasing the size proportionally, increasing the size dis-proportionally, or altering some or all of a shape of the predefined shape.

In Step S308, for every hotspot defined by the video producer, the processor 202 can assign a unique hotspot identification code. The hotspot identification code can be, for example, a numeric indicator such as "0," "1," "2," etc. The hotspot identification code can be unique for the video file in the second format. For example, no hotspot in the video file 300 in the second format will have the same hotspot identification code. The hotspot identification code can also be unique for not only the current video file in the second format, but also all other video files in the second format and/or supplemented videos. The unique hotspot identification code can be stored in the cache 204 and/or the memory 206.

In Step S310, the video producer inputs mouse rollover information for each hotspot during playback of the supplemented video. The mouse rollover information includes information to be displayed when a video viewer places a mouse cursor over the hotspot. The mouse rollover information can be stored in the cache 204 and/or the memory 206. In Step S312, the video producer inputs click information for each hotspot during playback of the supplemented video. The click information includes information on what action to perform when the video viewer clicks on the hotspot with the mouse cursor. The click information can be stored in the cache 204 and/or the memory 206.

In Step S314, the video producer inputs click display information for each hotspot during playback of the supplemented video. The click display information includes information to display if the click information indicates that information should be displayed. The display information can be stored in the cache 204 and/or the memory 206. The click display information can include, for example, information regarding the object that has a corresponding defined hotspot, a description of the object that has a corresponding defined hotspot, a rating of the object that has a corresponding defined hotspot, a Web site related to the object that has a corresponding defined hotspot, an object related to the object that has a corresponding defined hotspot, number of items in stock of the object that has a corresponding defined hotspot, a price of the object, a latest bid in an auction setting of the object that has a corresponding defined hotspot, a stock price of the object, a history of the object, any other information that can be useful to a video viewer of the supplemented video, or any information that the video producer wishes to disclose to the video viewer.

The click information and the click display information can be inputted by searching a database for the object that the click display information corresponds to. For example, if the object is a motorbike, the video producer can search a potential hotspot object database for the motorbike corresponding to the object. The video producer can view the results and select the appropriate motorbike. The click information and/or click display information corresponding to the appropriate motorbike will then be stored in the cache 204 and/or the memory 206. The potential hotspot object database can comprise information that the video producer has already uploaded to the potential hotspot object database, such as if the video producer was a store owner. This allows the video producer to upload click information and click display information regarding the object which has corresponding defined hotspot, and which he desires to sell, only once for each type of object instead of multiple times. Subsequent supplemented videos which display the object can use the same click information and/or click display information that was previously uploaded by the video producer. For example, if the store owner has 10 items of brand A motorbikes, 200 items of brand B hats, and 300 items of brand C T-shirts, the store owner only has to upload information three times, once for brand A motorbikes, once for brand B hats, and once for brand C T-shirts. This reduces an amount of time the store owner spends in uploading information regarding the products he has to sell.

The potential hotspot object database can also be a variety of pre-stored information from one or more third parties which corresponds to the object that will be supplemented. If the video producer is not a store owner, this allows the video producer to use click information and/or click display information that other people have already created. This reduces a burden for the video producer to have to locate and/or generate a picture of the object or other information which the video producer may wish to display with the object. This may be especially beneficial for video producers who are not store owners, who have limited resources, and only have a few objects to sell. This could also be beneficial for small store owners with limited resources. By reducing the barriers and costs to utilizing appropriate click information and/or click display information, more objects could be sold from entities with lower amount of resources. Otherwise, the cost of inputting click information and/or click display information could inhibit the video producer from defining hotspots associated with objects which may have a low profit margin or which may be owned by an entity without a large amount of resource. Furthermore, in the above examples, the video producer may still update the click information and/or the click display information as inventory, price, and/or shipment dates change over time.

For example, an individual motorbike owner may create a supplemented video regarding his modified motorbike in order to sell the modified motorbike. However, the individual motorbike owner may not have access to expensive resources such as an expensive digital camera or have the time to produce pictures and/or descriptions for each component of the motorbike which will be the object of one or more hotspots. Furthermore, it may be difficult to produce pictures of certain components which are only partially exposed. By allowing the individual motorbike owner to take advantage of pre-stored information, the individual motorbike owner can simply select the desired pre-stored information corresponding to the object without having to write a description or produce a picture. This can encourage individuals without great time or monetary resources to produce supplemented videos and allow the individual motorbike owner to sell his motorbike.

The one or more third parties can be, for example, one or more store owners, which have objects for sale that corresponds to the object which will have a corresponding defined hotspot. In this case, the video producer can have no objects he wants to sell, but instead wishes to allow view viewers who view the supplemented video to purchase the objects in the supplemented video from a third party. Thus, for example, the individual motorbike owner with the modified motorbike may not want to sell his motorbike. Instead, the individual motorbike owner may have a great deal of pride in his motorbike and want to show other people some or all of the components that he has included in the motorbike. Alternatively, the individual motorbike owner may have a personal video, such as a home movie, in which he has performed a stunt, trip, and/or trick with the motorbike. Such stunts, trips, and/or tricks may, for example, display or accent a feature or attribute of the motorbike. The feature or attribute can be a feature or attribute that a producer or seller of the motorbike may want to emphasize or which the producer or seller of the motorbike may want publicized.

For example, if the video producer has a video of himself crashing the motorbike's front tire repeatedly into a tree to knock down the tree without any damage to the motorbike's front tire, the producer or seller of the motorbike's front tire may want to be associated with the video to emphasize a toughness of the motorbike's front tire. Thus, the individual motorbike owner can link the components which have a corresponding hotspot definition to stores which sell the component. This can also be economically beneficial to the individual motorbike owner since he could receive revenue from the stores which sell the component each time a video viewer purchases the component from the individual motorbike owner's supplemented video as will be explained later.

The mouse rollover information can also be entered by the video producer in a similar fashion. Steps S306 to S314 can be repeated for as many hotspots as the video producer desires to include in the supplemented video.

In Step S316, the processor 202 generates an extensible markup language (XML) file separate from the video file 300 as shown in FIG. 7. In FIG. 7, the XML file 400 includes three objects, a motorbike, a T-shirt, and a cap. Furthermore, the XML file 400 can include the click information 402 and the mouse rollover information 404. The click information 402, for example, calls a JavaScript. The JavaScript can indicate the click display information to be displayed. Instead of the JavaScript, however, there can also be an instruction instructing the processor 202 to launch a Web site or perform other operations. For example, the store owner could have a free promotional giveaway for a motorbike, but not for the T-shirt or the cap. The store owner can have the click information indicate that the click display information related to the cap or the T-shirt be displayed when the video viewer clicks on the hotspot corresponding to the cap or the hotspot corresponding to the T-shirt. However, the store owner can have the click information indicate that a Web site, designed specifically towards the promotional giveaway for the motorbike, is launched when the view viewer clicks on the hotspot corresponding to the motorbike. This allows the store owner to customize the experience he wants the video file viewer to have when watching the supplemented video.

The mouse rollover information 404 includes a description of the object corresponding to the hotspot that will be displayed when the mouse cursor is over the hotspot. For example, when the mouse is over the hotspot for the motorbike, the caption will read "Motorbike." Likewise, when the mouse is over the hotspot for the T-shirt, the caption will read "T-shirt," and when the mouse is over the hotspot for the cap, the caption will read "Cap." Although the caption currently reads "Motorbike" for the motorbike object, it can also include other information such as "Motorbike: $1,000 for a limited time only!" or "Motorbike: Winner of the best bike award!"

Furthermore, the caption is not limited to just text, but could also display an image by itself, or an image in conjunction with the text. The image, could be, for example, an image of the exact object corresponding to the hotspot, an image of the exact object corresponding to the hotspot in greater detail, an image of the same type of object as the object corresponding to the hotspot, an image of an object related to the object corresponding to the hotspot, or any other type of image the video producer wishes the video viewer to see. For example, when the mouse is over the hotspot for the motorbike, an image of the motorbike in a catalog could be displayed in addition to the text "motorbike." Likewise, an image of the award can be displayed along with the text "Motorbike: Winner of the best bike award!"

Although an XML file is used, other files can be used, such as standard generalized markup language (SGML), extensible hypertext markup language (XHTML), or any other language which can contain information related to the supplemented video.

In Step S318, the processor 202 generates an action script 500 separate from the video file 300 as seen in FIG. 8. The action script 500 can also include other commands not shown, but which may be appropriate for the supplemented video. The action script 500 includes a section 502 which retrieves the appropriate caption to be displayed during a mouse rollover. The section 502 uses a caption location information to indicate which caption in the XML file 400 to use on a mouse rollover. In FIG. 8, the unique hotspot identification code is also the caption location information.

For example, if the unique hotspot identification code is 0, the caption location information is also 0. This indicates that the first line is used for the caption. Thus, the caption "Motorbike" will be displayed on the mouse rollover. If the unique hotspot identification code is 1, the caption location information is 1. Thus, the second line is used for the caption and the caption will be "T-shirt." If the unique hotspot identification code is 2, the caption location information is 2. Thus, the third line is used for the caption and the caption will be "Cap."

However, the unique hotspot identification code does not need to be equivalent to the caption location. For example, the unique hotspot identification code assigned to a first hotspot can XXX-XXX with a corresponding caption location information of 0. The unique hotspot identification code assigned to a second hotspot can YYY-YYY with a corresponding caption location information of 1. The unique hotspot identification code assigned to a third hotspot can ZZZ-ZZZ with a corresponding caption location information of 2. In the above example, the unique hotspot identification code can translated to the appropriate caption location information. This can be accomplished, for example, using a lookup table. For example, if the processor 202 detects a hotspot with the unique hotspot identification code of XXX-XXX, the processor 202 can translate the unique hotspot identification code, to 0 using the lookup table, and access the first line of the XML file to determine the appropriate caption to display on the display 214.

In Step S320, the video producer indicates that the supplemented video should be generated. This can be accomplished, for example, by clicking on a button, such as a button labeled GENERATE SUPPLEMENTED VIDEO. The video producer can also indicate that the supplemented video should be generated through one or more of a variety of keyboard buttons being depressed.

In Step S322, hotspot information regarding the location of each hotspot and the duration of each hotspot is embedded into the video file 300. In Step S324, information regarding the action script and the XML file are embedded into the video file 300 so that the supplemented video which is generated has an indication of which action file and/or XML file to access during playback of the supplemented video. In Step S326, the supplemented video is generated. During the generation of the supplemented video, the hotspots can also be made invisible such that they are not visible to the viewer of the supplemented video, even though a mouse rollover on the hotspot may trigger an action.

Because the XML file 400 and the action script 400 are separate from the supplemented video, a playback performance of the supplemented video is improved and the resources necessary to playback the supplemented video are reduced. Furthermore, since the XML file 400 is separate from the supplemented video, the XML file 400 can be modified even after the supplemented video has been generated. Thus, for example, the click information 402 and/or the click display information can be altered after the supplemented video has been generated. This allows replacement products to be shown or updated pictures to be displayed. This is also particularly advantageous if the original object that is supplemented is out of stock. When the object is out of stock, one or more replacement products can be shown instead.

The present invention may also be useful where there is a price change in the object or a change in description of the object. This is also advantageous when there is a limited time sale of the object. For example, if the motorbike 302 is on sale for two weeks, the video producer would only need to edit the XML file 400 to change the click display information when the sale begins and after the sale ends. Conventionally, the video producer would have had to re-access the original video file, re-access the original file indicating any click display information, re-edit both files, and re-generate the supplemented video. The conventional process can be time consuming and inefficient, whereas the present invention allows the video producer to easily edit a reduced amount of files to change information regarding the object. This allows the video producer to be more responsive regarding the object and produce a more accurate experience for the video viewer.

The present invention also allows the supplemented video to be used for a variety of purposes in addition to an online store, such as for an instructional how-to-guide to perform some sort of repair. In such a case, the caption, the click information 402 and/or the click display information can display information regarding the object corresponding to the hotspot which may be beneficial in performing the repair, such as schematics of the object. The click information 402 and/or the click display information could also display other books, manuals, or descriptions which may be particularly useful for the video viewer in performing the repair.

The present invention can also be used as an educational video, such as a video of a historic site. For example, the supplemented video could be a video of a room within a museum. The hotspots could correspond to one or more of the paintings. In such a case, the caption, the click information 402 and/or the click display information could display information regarding where to purchase replicas of paintings, more information regarding the artists, or even vacation packages to the museum.

The present invention can also be used in a lecture video, such as a lecture for a class given by a professor. The hotspots could correspond to equations written on a board, or even objects that the professor is holding. In such a case, the caption, the click information 402 and/or the click display information could display information regarding other books by the professor, books related to the object, or any other information which deemed important and/or necessary by the professor or video producer.

The present invention can also be used for an auction Web site, in which the objects have a corresponding hotspot are up for bid. In such a case, the caption, the click information 402 and/or the click display information could display information regarding the current price of the object, prices of similar objects, historical prices of the object, the minimum bid for the object, whether the object is available or has already been sold, the start time of the auction, the end time of the auction, the duration of the auction, or any other information which would be useful in an auction.

Furthermore, the mouse rollover indicating the caption that should be displayed can be altered after the supplemented video has been generated. This is particularly advantageous when new models of the object are released and/or the object has a new description that can be added to it. The new description can include, for example, a notification that the object has won a new award. Furthermore, if there are mistakes in the caption which are noticed after the supplemented video is generated, the caption can easily be fixed by modifying only the mouse rollover information without requiring the supplemented video to be re-generated. The alteration of the caption is also beneficial when the supplemented video is to be played to different audiences. For example, if a supplemented snowboarding video is to be played for a male audience, a certain type of description and/or font or text color can be used. However, if the supplemented snowboarding video is to be played for a female audience, a different description and/or font or text color can be used. Likewise if the supplemented snowboarding video is to be played for an English speaking crowd, English text can be used, whereas if the supplemented snowboarding video is to be played for a Spanish speaking crowd, Spanish text can be used. This allows the video producer to customize the supplemented video towards his audience and produce a better video viewing experience for his audience.

Figure 9:
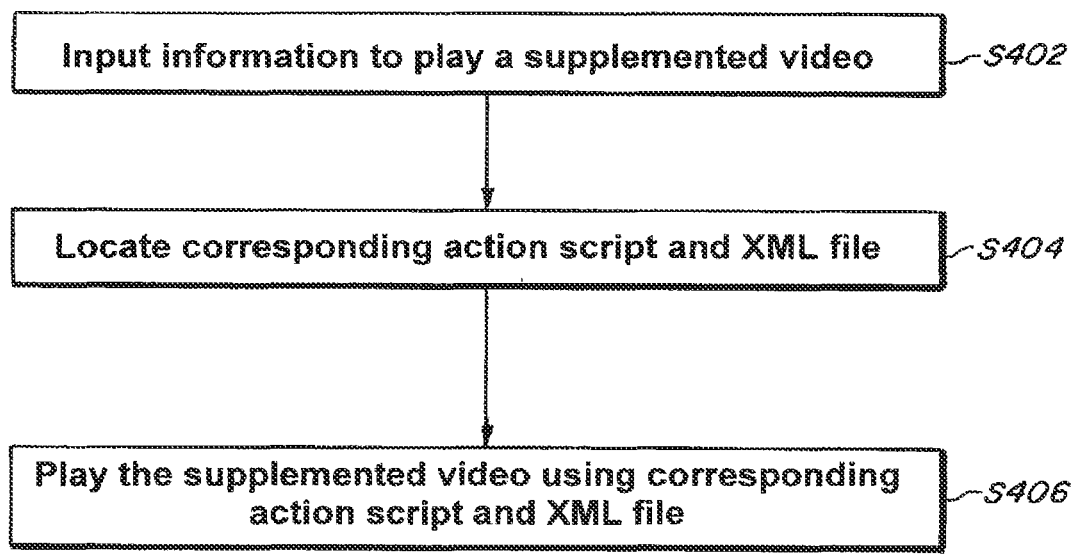
FIG. 9 is a flow chart for a method of playing a supplemented video according to an embodiment of the present invention.

In one embodiment, the present invention displays a supplemented video as shown in FIG. 9. The supplemented video creates a seamless interactive experience for the video viewer which allows the video viewer to learn more about certain objects in the supplemented video or actually purchase certain objects in the supplemented video. For example, the video viewer can watch the supplemented video and purchase objects shown in the supplemented video while the supplemented video is playing. Therefore, the video viewer does not need to interrupt his viewing experience in order to purchase the object or wait until the end of the video in order to purchase the object.

In Step S402, the video viewer inputs information to play the supplemented video. This can be accomplished, for example, by clicking on a PLAY button or other similarly labeled button. In Step S404, the processor 202 locates the action script 500 and the XML file 400 corresponding to the supplemented video. This can be accomplished, for example, by reading information embedded in the supplemented video, which indicate the action script and/or the XML file that corresponds to the supplemented video. In Step S406, the processor 202 plays the supplemented video using the corresponding action script 500 and the corresponding XML file 400.

Figure 11:
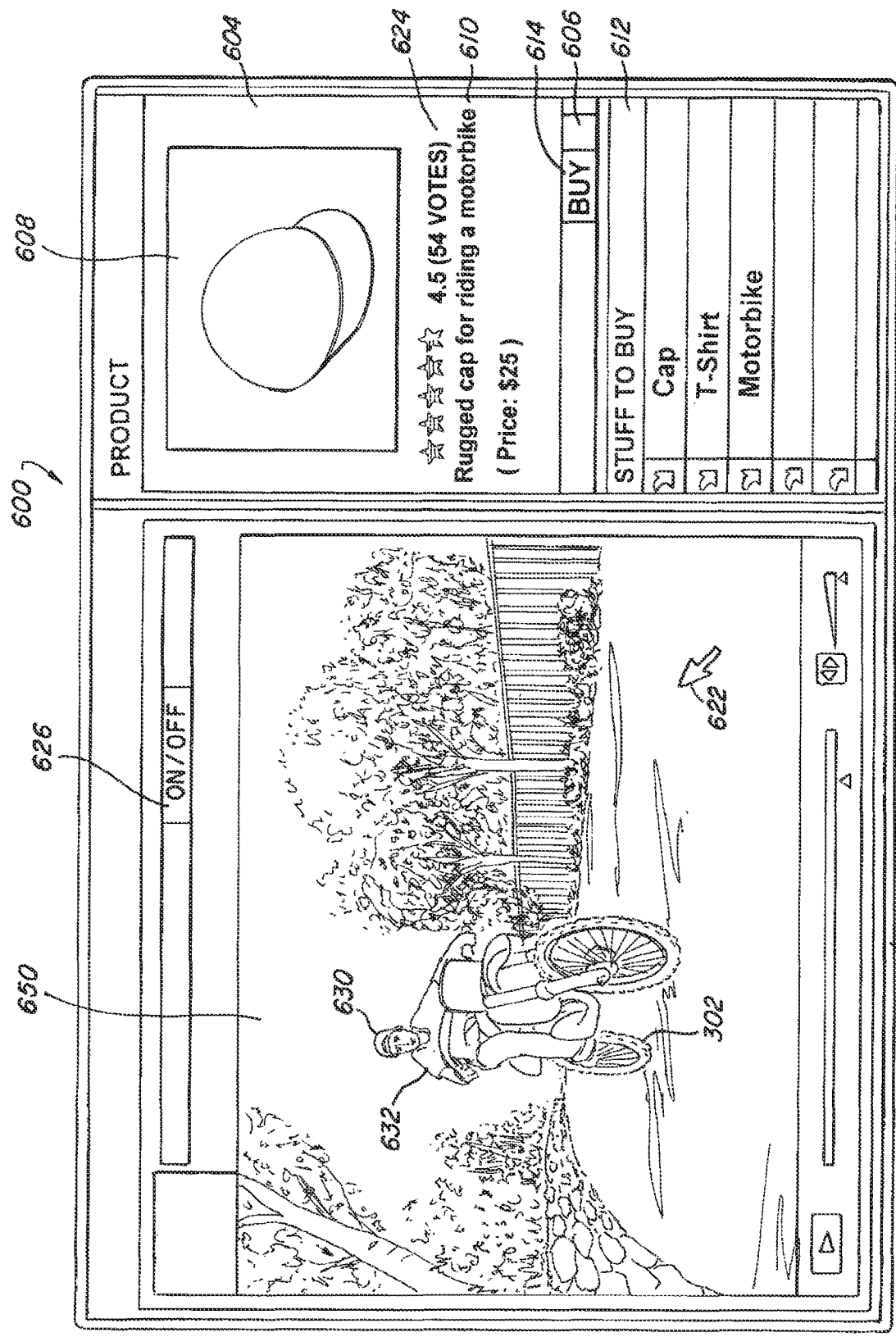
FIG. 11 is a screen shot of a playback of a supplemented video according to an embodiment of the present invention.

The processor 202 can instruct the display 214 to display the supplemented video during playback of the supplemented video as shown in FIG. 11. The supplemented video 650 is displayed in a video display frame 600 in the display 214. The video display frame 600 is composed of a first location 602, a second location 604, and a third location 606.

The first location 602 displays the supplemented video. The first location 602 displays the supplemented video 650, an ON/OFF button 626, and a mouse cursor 622. Although the mouse cursor 622 is currently overlayed on top of the supplemented video 650, the mouse cursor 622 can traverse anywhere in the video display frame 600. In the supplemented video 650, the motorbike 302 is tagged with a hotspot. The ON/OFF button 626 allows a video viewer to turn ON or OFF the hotspots in the supplemented video 650.

When the ON/OFF button is set to ON, the hotspots are active and when the mouse cursor 622 is over the hotspot, then the caption corresponding to the hotspot is displayed. Furthermore, the mouse cursor 622 can click on the hotspot to display the click display information corresponding to the hotspot.

However, when the ON/OFF button is set to OFF, the hotspots are inactive and no action occurs when the mouse cursor 622 is over the hotspot or when the mouse cursor 622 clicks on the hotspot. The video viewer can click on the ON/OFF button at any time, even during the middle of the playback of the supplemented video. The ON/OFF button allows the video viewer to customize his own experience when viewing the supplemented video. For example, the video producer may create an amazing video of a snowboarder performing a trick. The video viewer may not wish to have the hotspots appear when his mouse cursor is over the supplemented video. For example, the video viewer may want to use his mouse cursor to help him visually track a height the snowboarder reaches when he performs his trick and does not want a caption to appear in case the video viewer accidentally places his mouse cursor over the snowboarder.

The ON/OFF button could also be used to customize selection of which hotspots to view. For example, in one embodiment, there is an ON/OFF button corresponding to each category of objects that have corresponding hotspots. For example, a supplemented motorbike video may have two categories, MOTORBIKE and CLOTHING with an ON/OFF button associated with each category. If the video viewer selects the OFF button for the CLOTHING category, but selects the ON button for the MOTORBIKE category only the hotspots corresponding to MOTORBIKE objects will be active. Likewise, if the video viewer selects the ON button for the CLOTHING category, but selects the OFF button for the MOTORBIKE category, only the hotspots corresponding to CLOTHING objects will be active. If the video viewer selects the OFF button for both categories, no hotspots will be displayed. Again, this allows the video viewer to customize his experience and select which hotspots he wishes to interact with.

The second location 602 displays the click display information, which can be retrieved by accessing the XML file 400. The click display information includes an image 608 of an object that has a corresponding hotspot, a rating system 624 of the object that has a corresponding hotspot, and/or a description 610 of the object. The description 610 of the object can include, for example, a wide variety of information such as a written description of the object and/or a price of the object. Although the click display information display information includes information regarding the object that has a corresponding hotspot, the click display information can also display information regarding other objects that may be related to the object that has a corresponding hotspot. The click display information could also display information such as industry information related to the object, consumer ratings of the object, a current auction price of the object, a historical sales price of the object, reports regarding the object, or any other type of information which the video producer believes may be useful to the video viewer.

The third location 606 displays a list 612 of objects that have corresponding hotspots, which can be purchased. The list 612 can be generated by analyzing the click information and/or click display information in the XML file 400. When the video viewer clicks on an object in the list 612, the click display information for the corresponding object can also be displayed in the second location 602 as if the video viewer had clicked on a hotspot. The third location 606 also displays a BUY button 614. When the video viewer clicks on the BUY button using the mouse cursor 622, the processor 202 can add the object displayed in the second location 606 to a SHOPPING CART, which will be described below. Although a BUY button 614 is depicted, one or more buttons and/or links can be used in conjunction or instead of the BUY button. The one or more buttons and/or links can allow more information to be displayed in the second location 602 and/or the third location 604. In addition the one or more buttons and/or links could launch a new browser to display more information. The one or more buttons and/or links could be connected to another Web site.

In the supplemented video 650, a cap 630, a T-shirt 632, and the motorbike 302 have hotspots corresponding to each of the objects. In FIGS. 11-14, each of the hotspots are active, but are invisible to the video viewer. In one embodiment, a shaded hotspot is visible on a mouse rollover of the hotspot. In another embodiment, an outline of the hotspot is visible on a mouse rollover of the hotspot. In another embodiment, all or a portion of each of the hotspots are visible even without a mouse rollover. In yet another embodiment, all or a portion of each of the hotspots appears when a mouse rollover occurs on any of the objects.

In still another embodiment, all or a portion of each of the hotspots appears for a particular category when a mouse rollover occurs on any of the objects in that category. For example, if the video viewer places his mouse cursor over the cap 630, all clothing items with a corresponding hotspot would also be visible either as a shaded hotspot or an outline of the hotspot. In such a case, the hotspot for the T-shirt 632 would also be visible. The visibility of the hotspots can help the video viewer to determine where the hotspots are located so that the video viewer can more easily place his mouse cursor over the hotspots. This can be advantageous since some of the hotspots may correspond to a relatively small object and thus a video viewer would have to be extremely precise in his mouse cursor movements in order to place his mouse cursor over the hotspot or to click on the hotspot. The click display information displayed corresponds to the cap 630 because a video viewer has clicked on the hotspot of the cap 630, the video viewer has clicked on the listing of the cap 630 in the list 612, or the cap 630 is a default click display information that is displayed since it is the first object in the list 612.

Figure 10:
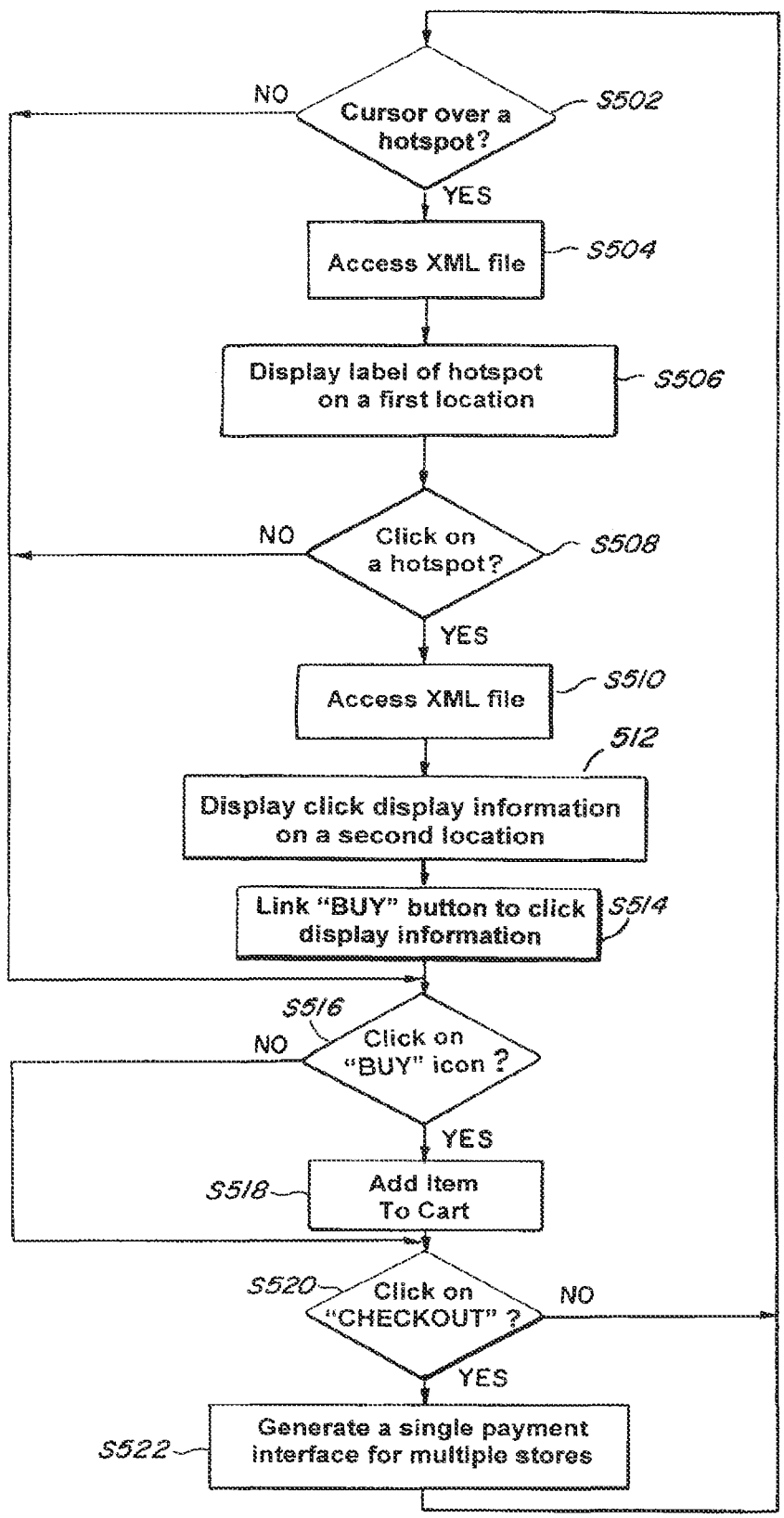
FIG. 10 is a flow chart of the processor operation during a playback of a supplemented video according to an embodiment of the present invention.

During playback of the supplemented video in step S406, the processor 202 can execute a loop while the supplemented video is being played, as shown in FIG. 10. The processor can exit the loop disclosed in FIG. 10 when the processor ceases playing the supplemented video. In Step S502, the processor 202 determines whether there is a mouse rollover over a hotspot in the supplemented video. A mouse rollover occurs when the mouse cursor is over the hotspot in the supplemented video. If there is no mouse rollover over a hotspot in the supplemented video, the processor 202 proceeds to step S516 which will be described below. For example, as seen in FIG. 11, the motorbike 302, the cap 630, and the T-shirt 632 have hotspots corresponding to each of the objects. However, the mouse cursor 622 is not over any of the hotspots and therefore there is no caption that is displayed.

Figure 12:
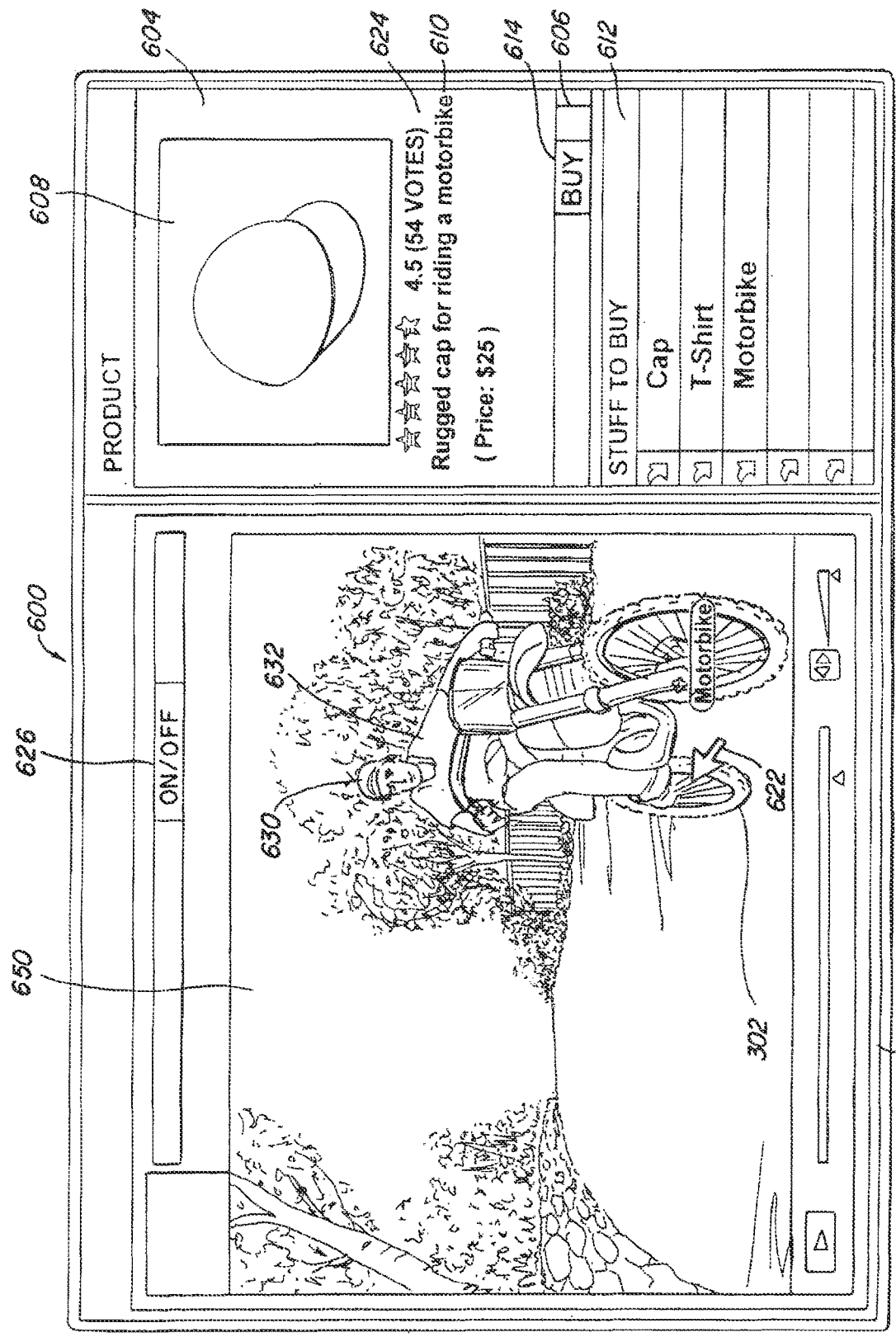
FIG. 12 is a screen shot of a playback of a supplemented video according to an embodiment of the present invention.
Figure 13:
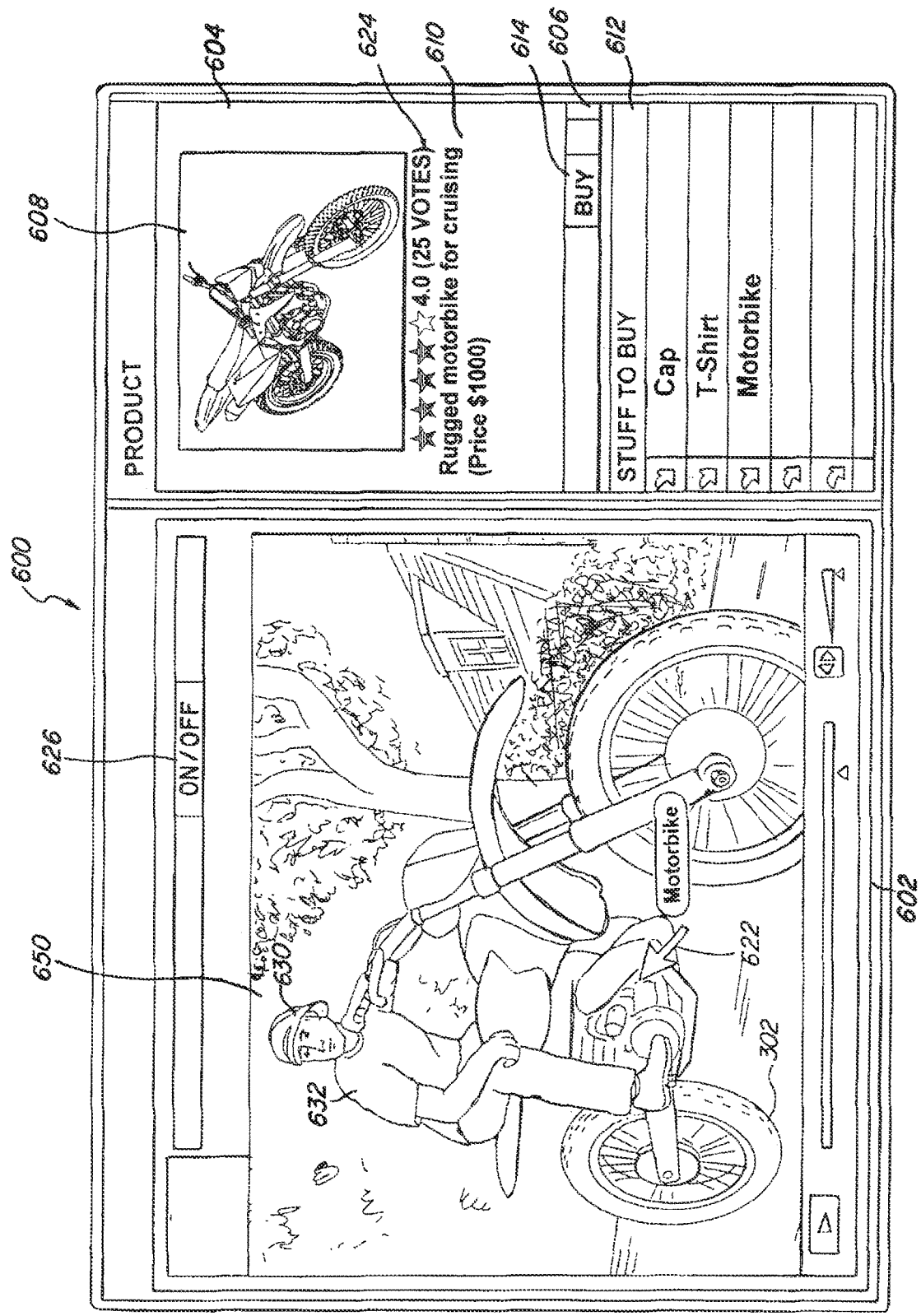
FIG. 13 is a screen shot of a playback of a supplemented video according to an embodiment of the present invention.

When the processor 202 determines that a mouse cursor is over a hotspot in the supplemented video, the processor 202 accesses the XML file 400 in Step S504. Based on the XML file 400 and the unique hotspot identification code assigned to the hotspot, the processor 202 displays a caption of a corresponding hotspot, all hotspots, or a select number of hotspots such as those related to the object in the corresponding hotspot. The caption can be displayed in a location adjacent the hotspot on the display 214 or overlayed on the object corresponding to the hotspot. The caption can also be displayed any other desired or designated location, or even on a separate screen. For example, as seen in FIG. 12, the mouse cursor 622 is over the hotspot for the motorbike 302. Thus, a caption 628 for the motorbike 302 is retrieved from the XML file 400 and displayed adjacent the motorbike 302.

The caption 628 can move along with the motorbike 302 as the motorbike 302 switches position in the supplemented video. This movement can be constant, or it can be periodic. For example, the caption can be a predetermined distance from a certain location in the motorbike 302, or the caption can be at a certain location until the motorbike has moved a certain distance. Then the location of the caption will be readjusted in the supplemented video.

In Step S508, the processor 202 determines if the video viewer clicked on a hotspot. If the video viewer has not clicked on the hotspot, the processor 202 proceeds to Step S516, which will be described below. When the processor 202 determines that the video viewer has clicked on the hotspot in the supplemented video, the processor 202 accesses the XML file in Step S510. Based on the XML file and the unique hotspot identification code assigned to the hotspot, the processor 202 displays click display information corresponding to the hotspot in the second location 604 of the display 214 in Step S512. This can be seen in FIG. 13. Since the video viewer has clicked on the hotspot for the motorbike 302, the click display information for the motorbike 302 is now displayed in the second location 604.

In one embodiment, once the video viewer has interacted with the motorbike 302, an indication is shown that the video viewer has already interacted with the motorbike 302. For example, whereas the hotspot was previously invisible to the video viewer, once the video viewer clicks on the hotspot, the hotspot can be shaded. Alternatively, whereas the hotspot was previously invisible to the video viewer, once the video viewer clicks on the hotspot, an outline of the hotspot can be displayed. This is beneficial in allowing the video viewer to keep track of which hotspots the video viewer has already interacted with either through a mouse rollover, a mouse click, or any other type of interaction.

In Step S514, the processor 202 links the BUY button or other similar button to the click display information. Thus, if the video viewer clicks on the BUY button, he will add the object depicted in the click display information to his shopping cart as opposed to any other object listed in the list 612. In FIG. 12, the BUY button is associated with the click display information for the cap 630. However, in FIG. 13, the BUY button is associated with the click display information for the motorbike 632.

Figure 14:
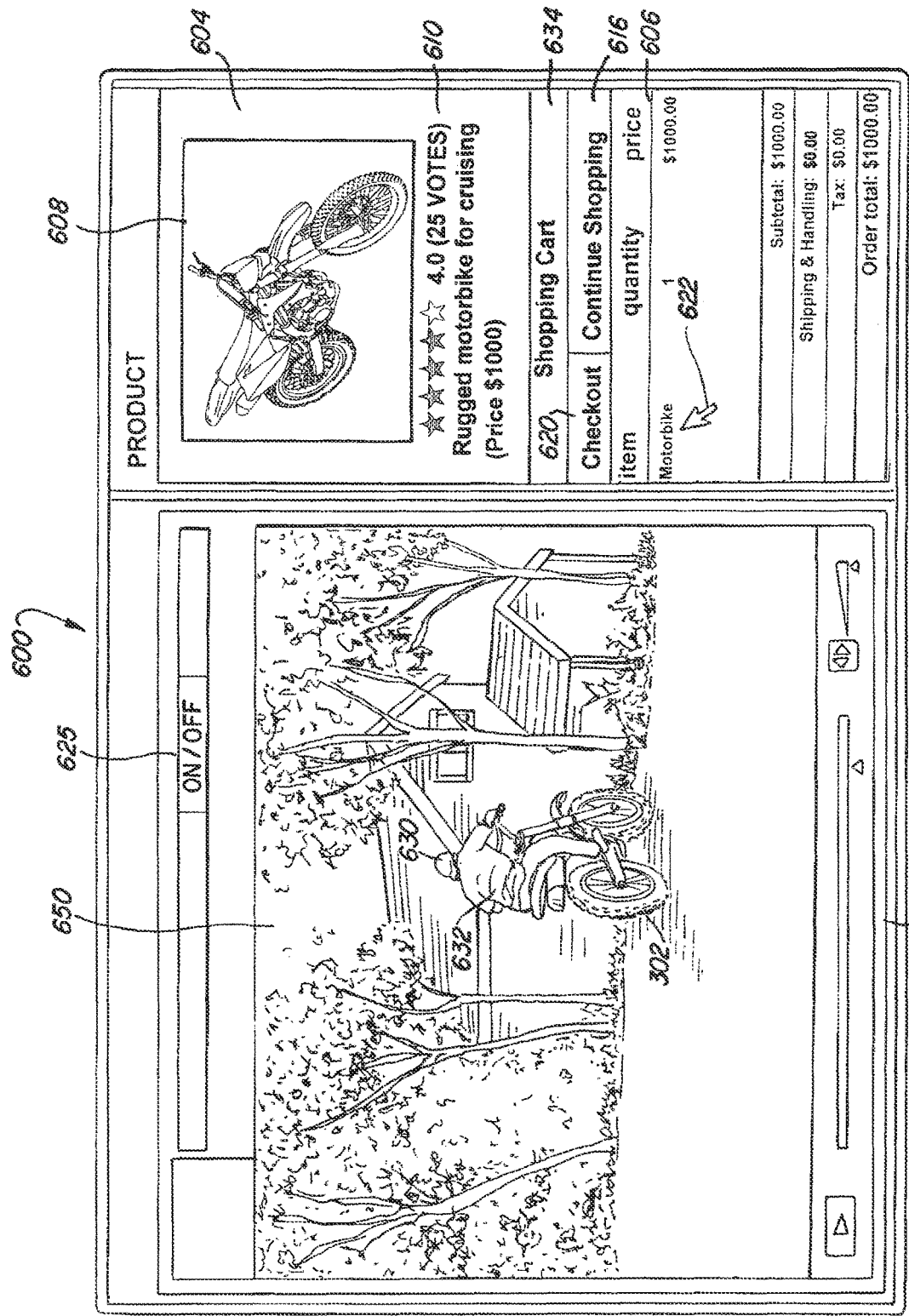
FIG. 14 is a screen shot of a playback of a supplemented video according to an embodiment of the present invention.

In Step S516, the processor 202 determines whether the video viewer has clicked on the BUY button. If the video viewer has not clicked on the BUY button, then the processor 202 proceeds to Step S520 which will be described below. If, however, the processor 202 determines that the video viewer has clicked on the BUY button, the processor 202 adds the object displayed in the click display information to a shopping cart 634. As seen in FIG. 14, once the video viewer clicks on the BUY button 614 in FIG. 13, the object corresponding to the motorbike 302, which in this case is the motorbike 302 object itself, is added to the shopping cart 634.

In one embodiment, the video viewer could have a pre-registered account in which the video viewer has already logged in or authenticated the account, the video viewer could use an immediate buy option. In the immediate buy option, the video viewer simply clicks on the BUY button 614 to actually purchase the object without having to add the object to the shopping cart. In such a case, the pre-registered account could include payment and shipping information. The BUY button 614 could also indicate a confirmation screen before the actual purchase occurs to ensure that the video viewer actually intends to purchase the object. The pre-registered account can be encrypted for safety of the video viewer and the contents of the pre-registered account.

In both cases, when the video viewer is clicking or has clicked on the BUY button 614, the supplemented video continues to play. This reduces any interruptions to the video viewing experience for the video viewer. The video viewer does not have to interrupt his video viewing experience in order to find the product, enter his payment information, and/or enter his shipping information or wait until the end of the supplemented video in order to search for the objects described in the supplemented video in order to purchase the objects.

The shopping cart 634 replaces the list 612 in the third location 606. However, the shopping cart 634 can also be displayed in different location aside from the third location 606. The shopping cart 634 can also be displayed as a popup. The shopping cart includes a CHECKOUT button 620 and a CONTINUE SHOPPING button 616. Even when the object is added to the shopping cart 634, the supplemented video 650 can continue to play. Advantageously, this prevents interruptions in the supplemented video as the video viewer may want to continue viewing the supplemented video for other objects to purchase. If the video viewer clicks on the CONTINUE SHOPPING button 616, the list 612 can replace the shopping cart 634. Alternatively, if the shopping cart 634 is displayed as a popup, then the popup can be closed.

Furthermore as seen in FIG. 14, since the mouse cursor 622 is not on the hotspot of the motorbike 302 anymore, the caption is not visible anymore. In one embodiment, the caption can remain visible adjacent to the motorbike 302 for a predetermined period of time after the mouse cursor 622 is not on the hotspot. In another embodiment, the caption can remain visible once the video viewer has placed his mouse cursor 622 over the motorbike 302, even after the video viewer has removed the mouse cursor 622 over the motorbike 302.

In Step S520, the processor 202 determines whether the video viewer has clicked on the CHECKOUT button 620 or other similar button. If the video viewer has not clicked on the CHECKOUT button 620, then the processor 202 repeats Steps S502 to Steps S502 until the processor determines that the supplemented video has finished playing. If, however, the video viewer has clicked on the CHECKOUT button 620, then the processor 202 generates a single payment interface 700 for multiple stores as shown in FIG. 15. The single payment interface 700 can displayed on a new page or it can displayed anywhere in the video display frame 600. The single payment interface can also be displayed anywhere in the display 214.

The single payment interface 700 includes an account section 702 and a summary of the shopping cart 634. The account section 702 allows the video viewer to access the video viewer's pre-registered account including the video viewer's account information. To retrieve the account information, the single payment interface 700 can include a section to enter an e-mail address associated with the account and a password associated with the account. The e-mail address and the password can be used to authenticate the video viewer's pre-registered account to access the account information.

The account information can store, for example, the video viewer's personal information such as payment methods, shipping address, billing address, e-mail, phone number, etc. The payment method can include, for example, credit cards or checking accounts associated with the video viewer's account. The single payment interface 700 can allow the video viewer to pay for the objects in the shopping cart or in the immediate buy option using the payment methods stored in the account information.

The single payment interface provides a single common interface for the video viewer when he wants to purchase an object. Thus, if the video viewer purchases an object from a first store, he will encounter the same interface as if the video viewer purchases an object from a second store. In addition, even if the objects in the video viewer's shopping carts are from multiple different stores, the single payment interface still provides a single common interface for the video viewer. This reduces a number of accounts the video viewer must create and/or access in order to purchase objects since the video viewer can now access just a single account to purchase multiple objects from different stores. This feature of the present invention also enhances the security of the video viewer's personal information since the video viewer can reduce the number of accounts he has and also his potential exposure due to the information being stored in the many different accounts.

Although the single payment interface 700 includes an account section 702, the single payment interface 700 can also present an option for the video viewer to purchase the objects without accessing a pre-existing account. Instead, the single payment interface 700 can accept shipping and billing information in order to pay for the objects in the shopping cart 634. The video viewer therefore only has to provide the shipping and billing information once, even when there are multiple objects from different stores in the shopping cart 634. This simplifies the shopping experience for the video viewer and also provides more security for the video viewer since his shipping and billing information will be transmitted a fewer amount of times than if the video viewer had to input his shipping and billing information for each of the different stores. Furthermore, any transactions can be encrypted and also the storage of the account information can also be encrypted.

Figure 16:
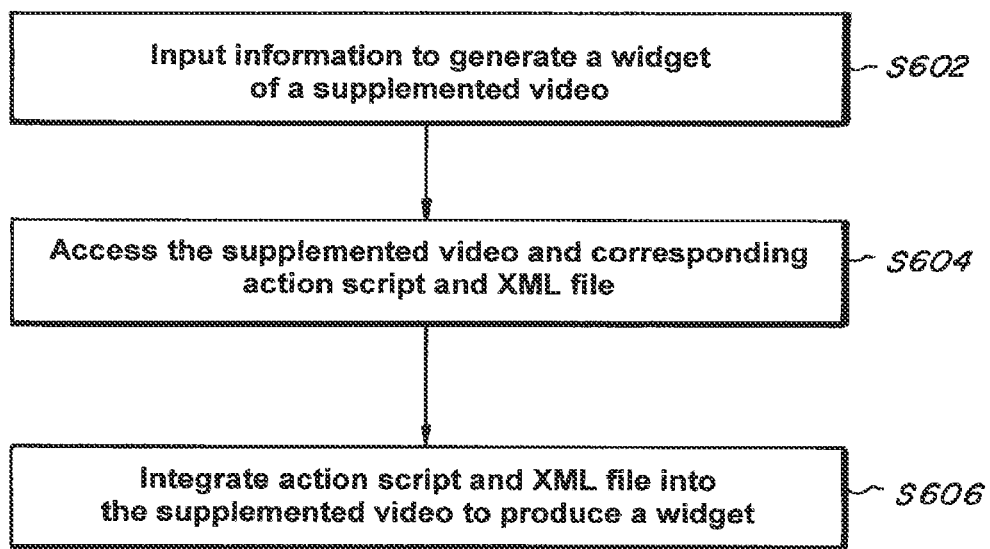
FIG. 16 is a flow chart for a method of generating a widget according to an embodiment of the present invention according to an embodiment of the present invention.

In one embodiment, the present invention generates a widget of a supplemented video as shown in FIG. 16. The widget can be, for example, a video widget. The widget allows the supplemented video to be shared in an easy manner without the necessity for special software or server to access the XML file or the action script. This can be beneficial where the supplemented video is a video which the video producers have finalized and now wants to become a viral video.

In Step S602, a video producer inputs information to generate a widget of a supplemented video. This can be accomplished, for example, by clicking on a GENERATE WIDGET button or other similar button and also inputting a location of the supplemented video in the memory 206. In Step S604, the processor 202 accesses the supplemented video and determines the action script 500 and the XML file 400 which correspond to the supplemented video. The processor 202 then accesses the action script 500 and the XML file 400 which corresponds to the supplemented video.

In step S606, the processor 202 integrates the action script 500 and the XML file 400 into the supplemented video to produce a widget.

The widget can be a stand alone application which can play the supplemented video. Thus, the widget no longer needs to access the action script 500 or the XML file 400. Thus, the widget can be uploaded to a Web site which can play videos in the second video format. There is no need for the Web site to be configured to specifically play supplemented videos. The Web site, for example, can be a social networking Web site, a tabloid Web site, a news Web site, a private Web site, a public Web site, a file sharing site, or any other appropriate site for distribution of the supplemented video. Furthermore, the supplemented video can also be stored and/or transmitted through a machine readable medium, file sharing sites, e-mail, or any other file storage and/or transmission means.

Figure 17:
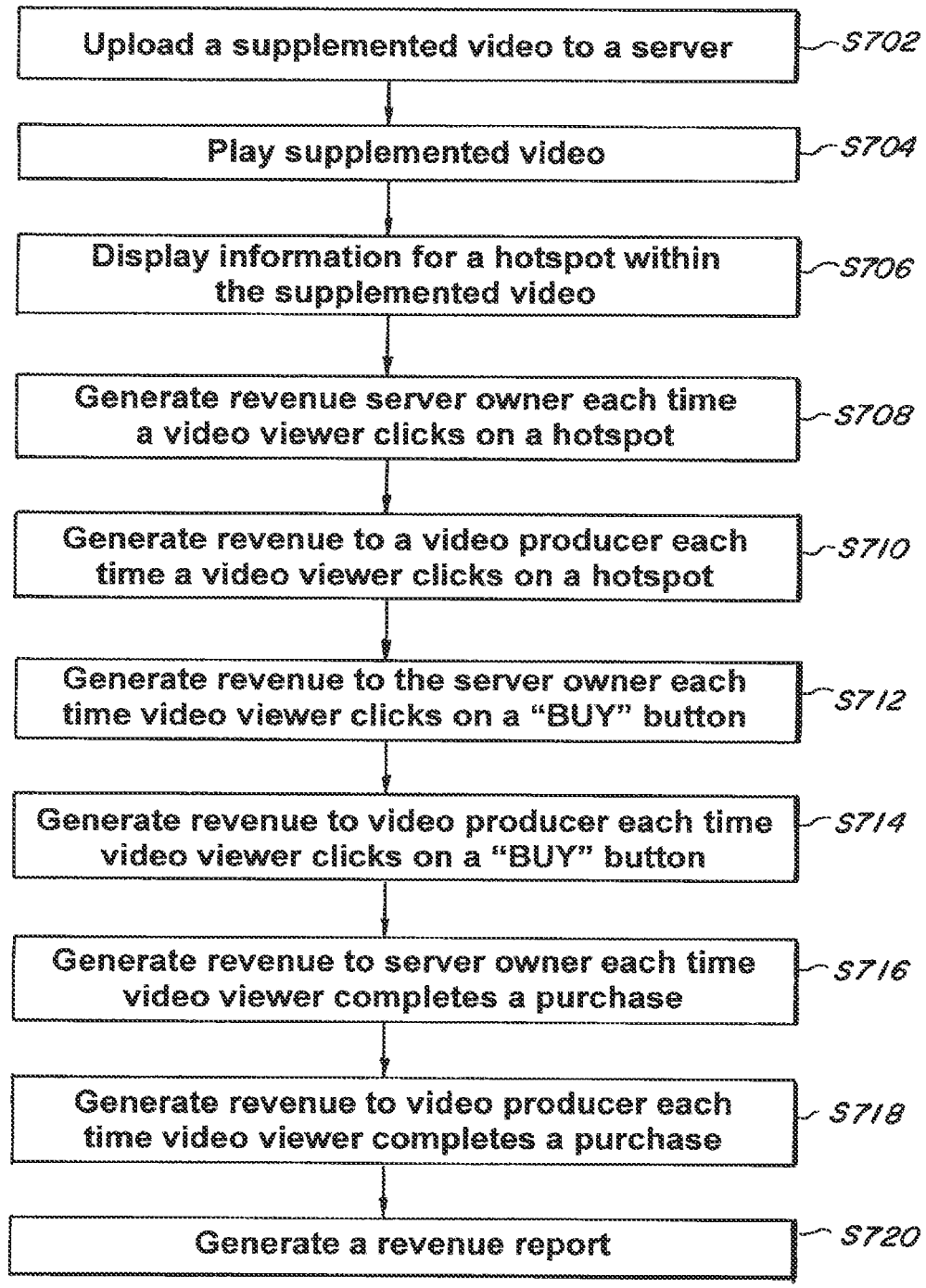
FIG. 17 is a flow chart of a method for generating revenue during a playback of a supplemented video according to an embodiment of the present invention.

In another embodiment, the present invention generates revenue based on the supplemented video as shown in FIG. 17. Since the supplemented video is interactive and objects in the video can be sold or be publicized through the supplemented video, the present invention allows revenue to be generated for such activity. The revenue generation could entice video producers to produce supplemented videos containing certain objects in the supplemented video. For example, if the video producer knows he will receive revenue for every purchase of a brand C T-shirt, he will be enticed to produce supplemented videos with brand C T-shirts as hotspots.

Furthermore, it could also entice video producers to include hotspots of objects in the supplemented video. Likewise, if the video producer produces a video with many products from many brands and he knows he will receive revenue for every purchase of a brand C T-shirt, the video producer will be more likely to define a hotspot for the brand C T-shirt in his supplemented video. By enticing video producers to produce supplemented videos with the object and/or define hotspots of the object in the supplemented videos, the present invention allows increases the marketing potential of the object. Thus, the present invention provides a strong and novel method of marketing an object.

As seen in FIG. 17, in Step S702, a video producer uploads a supplemented video to the server 102. The server 102 can be owned, for example, by a server owner. The video producer can be, for example, an owner of the supplemented video, an agent of the owner of the supplemented video, or any other person authorized to upload the supplemented video.

In Step S704, a video viewer indicates that the supplemented video to be played. The video viewer can be, for example, a video file viewer. In response to the indication, the processor 202 plays the supplemented video using the display 214. In Step S706, when the video viewer puts his mouse cursor over a hotspot, the processor 202 displays information regarding the hotspot in the display 214. The processor 202 then determines if the video viewer clicks on the hotspot. If the video viewer clicks on the hotspot, then the processor 202 generates revenue for the server owner in Step S708. Furthermore, the processor 202 can also generate revenue for the video producer in Step S710.

The processor 202 also determines if the video viewer clicks on the BUY button. If the video viewer clicks on the BUY button, the processor 202 generates revenue for the server owner in step S712 and for the video producer in Step S714. The processor 202 also determines if the video viewer has completed a purchase. The purchase can be completed during the playback of the supplemented video or after the completion of the playback of the supplemented video. If the video viewer has completed a purchase, the processor 202 generates revenue to the server owner in Step S716 and to the video producer in Step S718. In Step S720, the processor 202 generates a revenue report based on the revenue generated. The revenue report can be based on, for example, the revenue generated for the video producer and/or the server owner.

Figure 18:
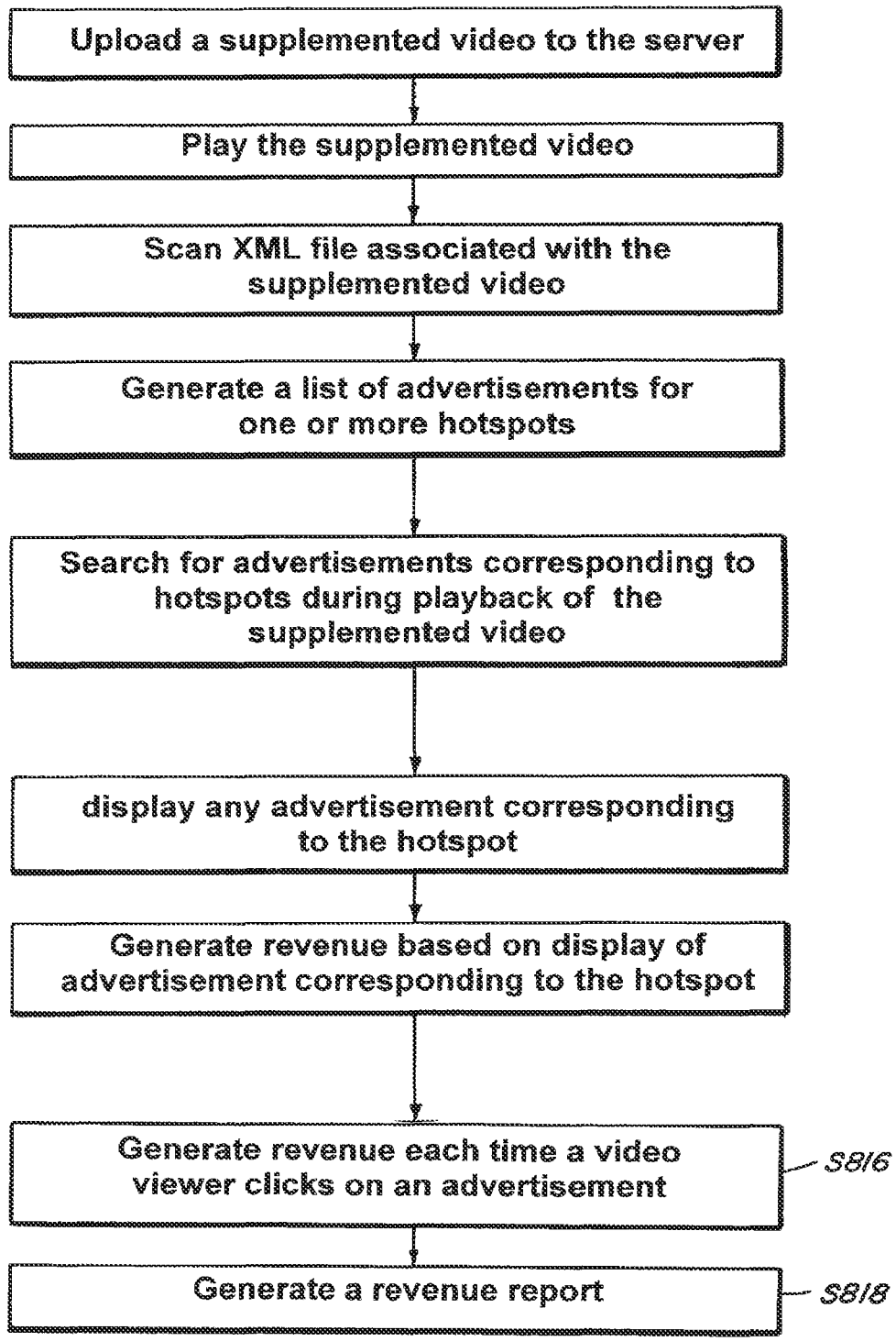
FIG. 18 is a flow chart of a method for generating advertisements corresponding to hotspots in a supplemented video according to an embodiment of the present invention.

In one embodiment, the present invention is a method for displaying advertisements during the playback of the supplemented video, as shown in FIG. 18. The present invention allows for a more focused and targeted display of advertisements. The present invention allows the advertisement to be selected based on the hotspot. Whereas previous advertisement generation may be based on a general concept of the video, the present invention allows the advertisement to be targeted not only towards the general concept of the video but also the specific objects with corresponding hotspots in the video. Furthermore by using the XML file, the advertisement generation is simplified and can be automated.

The advertisement that is displayed can trigger subsequent directed advertisements based upon rollover or click patterns of the video viewer. The advertisement can also trigger follow up communications such as a follow up e-mail, direct mailing, and/or phone calls. Thus, the present invention also allows a highly customizable advertisement generation through product placement, banner advertisements, pop-ups, etc.

In Step S802, a video producer uploads a supplemented video to the server 102, which can be owned by a server owner. The video producer can be, for example, an owner of the supplemented video, an agent of the owner of the supplemented video, or any other person authorized to upload the supplemented video.

In Step S804, the processor 202 plays the supplemented video using the display 214. The processor 202 locates the XML file associated with the supplemented video in the memory 206. The processor 202 scans the XML file associated with the supplemented video in Step S806. The scanning of the XML file can be performed immediately before the playback of the supplemented video or anytime before the playback of the supplemented video. For example, the XML file can periodically scanned before the playback of the supplemented video. Based on the scanning of the XML file, the processor 202 generates a list of advertisements for one or more hotspots in Step S808. During playback of the supplemented video, the processor 202 searches for advertisements corresponding to the hotspots based on the generated list of advertisements in Step S810.

In Step S812, the processor 202 displays any advertisements corresponding to the hotspot using the display 214. In Step S814, the processor 202 generates revenue for the video producer and/or the server owner based on the display of the advertisement corresponding to the hotspot. The processor 202 can also generate a bill or amount due for an owner of the advertisement based on an amount of times the advertisement is displayed or its location within the supplemented video or the display 214. The processor 202 also determines whether the video viewer has clicked on the advertisement. If the video viewer has clicked on the advertisement, the processor 202 generates revenue for the video producer and/or the server owner in Step S816. In Step S818, the processor 202 generates a revenue report based on the revenue generated. The revenue report can be based on, for example, the revenue generated for the video producer and/or the server owner. The processor 202 can also generate a bill or amount due for an owner of the advertisement based on an amount of times the advertisement is clicked. The revenue report could also include the bill or amount due for the owner of the advertisement.

Advantageously with the present invention, the advertisement appears in a more targeted manner. Whereas conventional advertisements may be based on the overall video, the present invention allows the advertisements to be focused to the specific product. For example, in a motorbike video where the rider performs several tricks on several motorbikes, a conventional advertising system may only display a single advertisement for a single motorbike. However, with the present invention, the advertising system of the present invention can display advertisements for each motorbike as the rider is using each motorbike. Furthermore, if the rider is wearing a T-shirt and a cap, the advertisements for the T-shirt and the cap can be displayed simultaneously with the advertisement for one of the motorbikes. This provides greater flexibility with respect to advertisements and allows the advertisements to be more focused on the object that is being displayed in the supplemented video.

Figure 19:
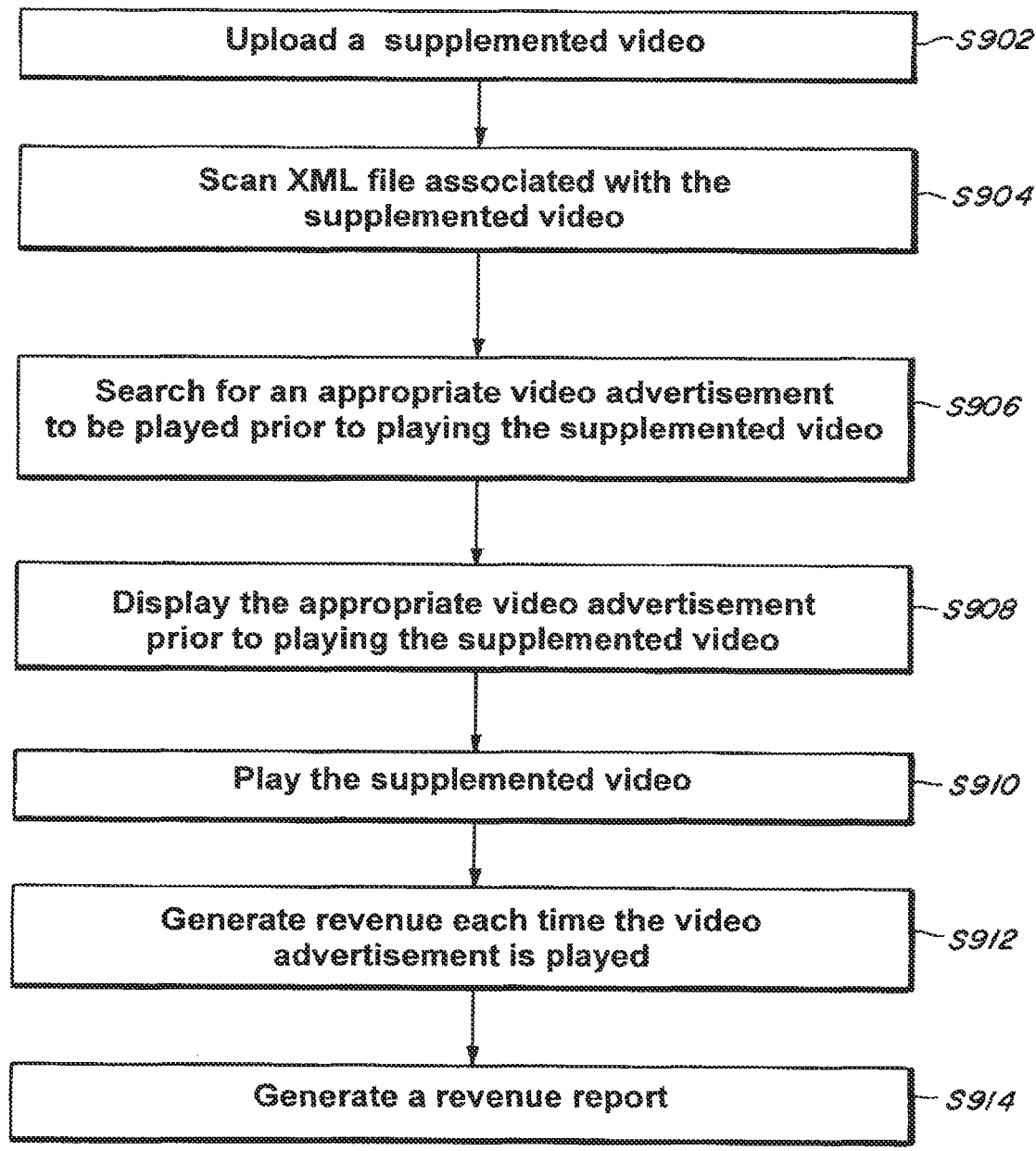
FIG. 19 is a flow chart of a method for generating video advertisements corresponding to hotspots in a supplemented video according to an embodiment of the present invention.

In another embodiment, the present invention can generate a video advertisement as shown in FIG. 19. With the use of the XML file, the click information, click display information, and/or caption stored therein, the present invention provides a more targeted method for selecting video advertisements to be displayed. Since the click information, click display information, and/or caption indicate information regarding the objects which have corresponding hotspots, they provide a greater indication of the environment in which the video viewer will be experiencing the supplemented video. For example, if a supplemented video will have hotspots corresponding to a brand A motorbike, a brand B cap, and a brand C T-shirt, the video advertisement could be targeted towards the brand B cap instead of any generic cap. Furthermore, if the supplemented video is about a motorbike competition with lots of tricks, but most of the hotspots are directed towards T-shirts, the video advertisement could be selected to be about T-shirts since the video viewer will have much more interaction with T-shirts than motorbikes.

In Step S902, a video producer uploads a supplemented video to the server 102, which can be owned by a server owner. The video producer can be, for example, an owner of the supplemented video, an agent of the owner of the supplemented video, or any other person authorized to upload the supplemented video.

In Step S904, the processor 202 begins a process of playing the supplemented video using the display 214. The processor 202 locates the XML file associated with the supplemented video in the memory 206. The processor 202 scans the XML file associated with the supplemented video in Step S906. The scanning of the XML file can be performed immediately before the playback of the supplemented video or anytime before the playback of the supplemented video. For example, the XML file can periodically scanned before the playback of the supplemented video. Based on the scanning of the XML file, the processor 202 generates an appropriate video advertisement to be played prior to playing the supplemented video in Step S908.

Advantageously, by scanning the XML file immediately before the playback of the supplemented video, the latest XML file can be scanned. This ensures that the latest description of the objects are searched, since the XML file can be altered after the supplemented video has been generated. Furthermore, by scanning the XML file periodically before the playback of the supplemented video, the appropriate video advertisement can generated before the video viewer indicates that he wants to play on the supplemented video. This can allow the appropriate video advertisement to be immediately loaded, reducing a strain on the resources available and/or also allowing the supplemented video to be buffered more efficiently. A combination of periodically scanning the XML file and scanning the XML file immediately before the playback of the supplemented video can also be employed.

In Step S910, the processor 202 displays the appropriate video advertisement prior to playing the supplemented video. In Step S912, the processor 202 generates revenue for the server owner and/or the video producer each time the video advertisement is played. In Step S914, the processor 202 generates a revenue report based on the revenue generated. The revenue report can be based on, for example, the revenue generated for the video producer and/or the server owner. Likewise, the processor 202 can also generate a bill or amount due for an owner of the video advertisement based on an amount of times the video advertisement is displayed. The revenue report could also include the bill or amount due for the owner of the advertisement.

Figure 20:
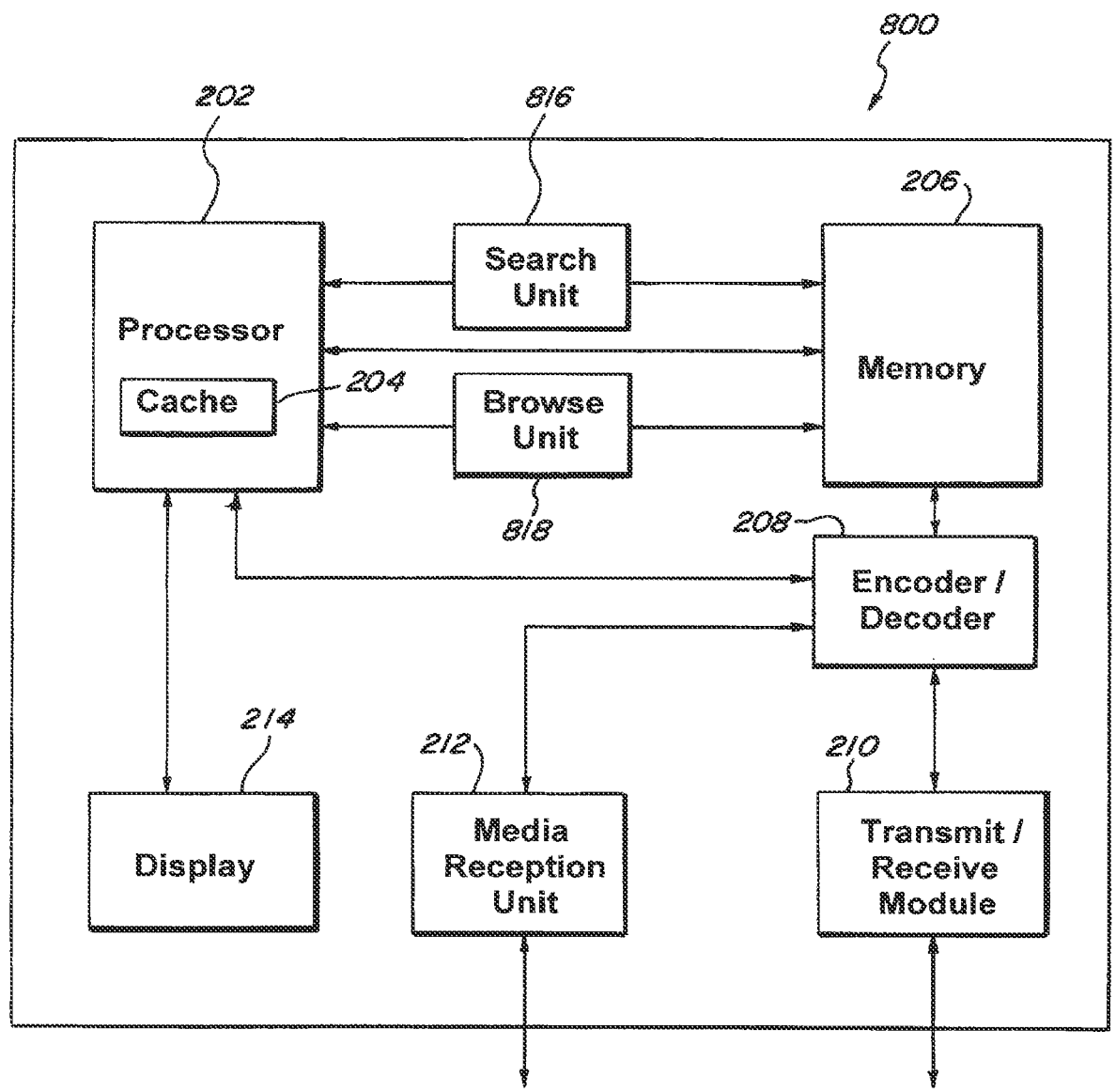
FIG. 20 is a box diagram of a marketplace according to an embodiment of the present invention.

In one embodiment, the present invention is a marketplace 800 as shown in FIG. 20, which can be located on the server 102. The present invention allows video viewers to make a more informed decision when purchasing objects and thus can encourage video viewers to purchase objects which are beneficial to them and to refrain from purchasing objects which do not the video viewer's specifications for an object. The present invention allows video viewers to easily find objects to purchase and also allow the video viewers to find supplemented videos containing hotspots corresponding to the objects. This allows the video viewer to make a more informed decision when purchasing the object. This could also be advantageous for the video producer if the video producer is a store owner because many video viewers may not purchase an, object without seeing the object in action such as in a supplemented video. Furthermore, if the video viewer sees the object in action, the video viewer could ultimately decide to not purchase the object because it does not fit the video viewer's requirements for the object. This is still beneficial to the store owner because it could reduce dissatisfied customers and ultimately reduce negative feedback and/or returns.

The marketplace 800 is similar to the electronic device 200, except that the marketplace 800 further includes a search unit 816 and a browse unit 818. The search unit 816 can search the memory for the search term and display results based on the search, which will be described more fully below. The browse unit 818 allows a video viewer to browse the memory for a particular supplemented video and/or object that the video viewer wishes to purchase or view. In the marketplace 800, the memory 206 can store a supplemented video, an action script associated with the supplemented video, an XML file associated with the supplemented video, click display information, and any other type of information that is associated with the supplemented video.

Figure 21:
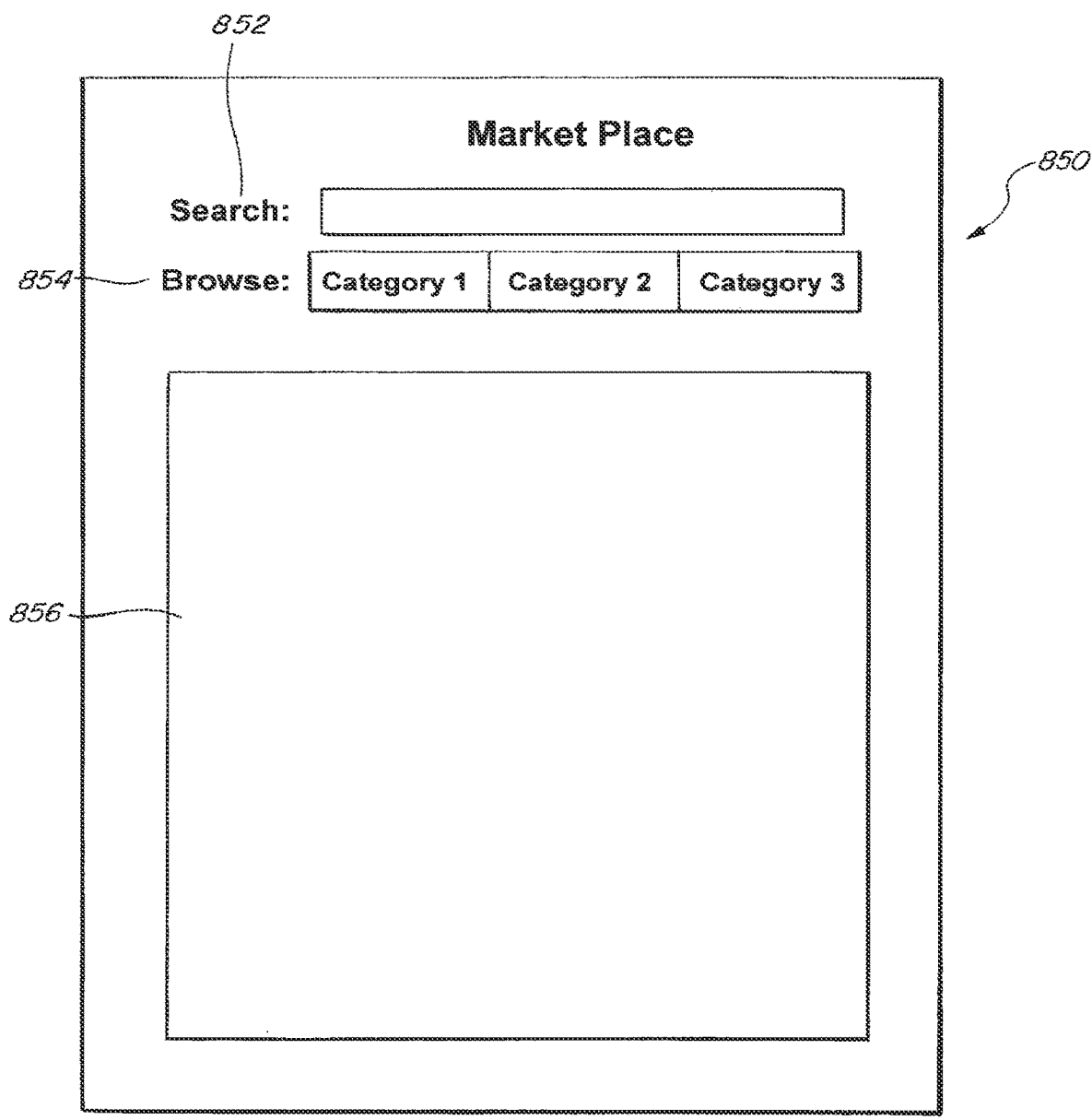
FIG. 21 is a screenshot of a marketplace interface according to an embodiment of the present invention.

The marketplace 800 can also formulate a marketplace interface 850 in FIG. 21 which can be seen on a client 100. As seen in FIG. 21, the marketplace interface 850 includes a search section 852, a browse section 854, and a multipurpose section 856. The search section 852 accepts a search term from the video viewer and defines a search query based on the search term which will be described more fully below. The browse section 854 allows the video viewer to browse through different categories to find the supplemented video the video viewer wishes to play based on the supplemented video or the products having corresponding hotspots therein. When the video viewer selects a category, the browse unit 818 formulates a search query based on the category to identify the supplemented videos which are associated with the selected category. The multipurpose section 856 can list the search results when searching or list the categories and/or files available when browsing. The multipurpose section 856 can also display the video display frame 600 when the video viewer chooses to play a supplemented video.

Figure 22:
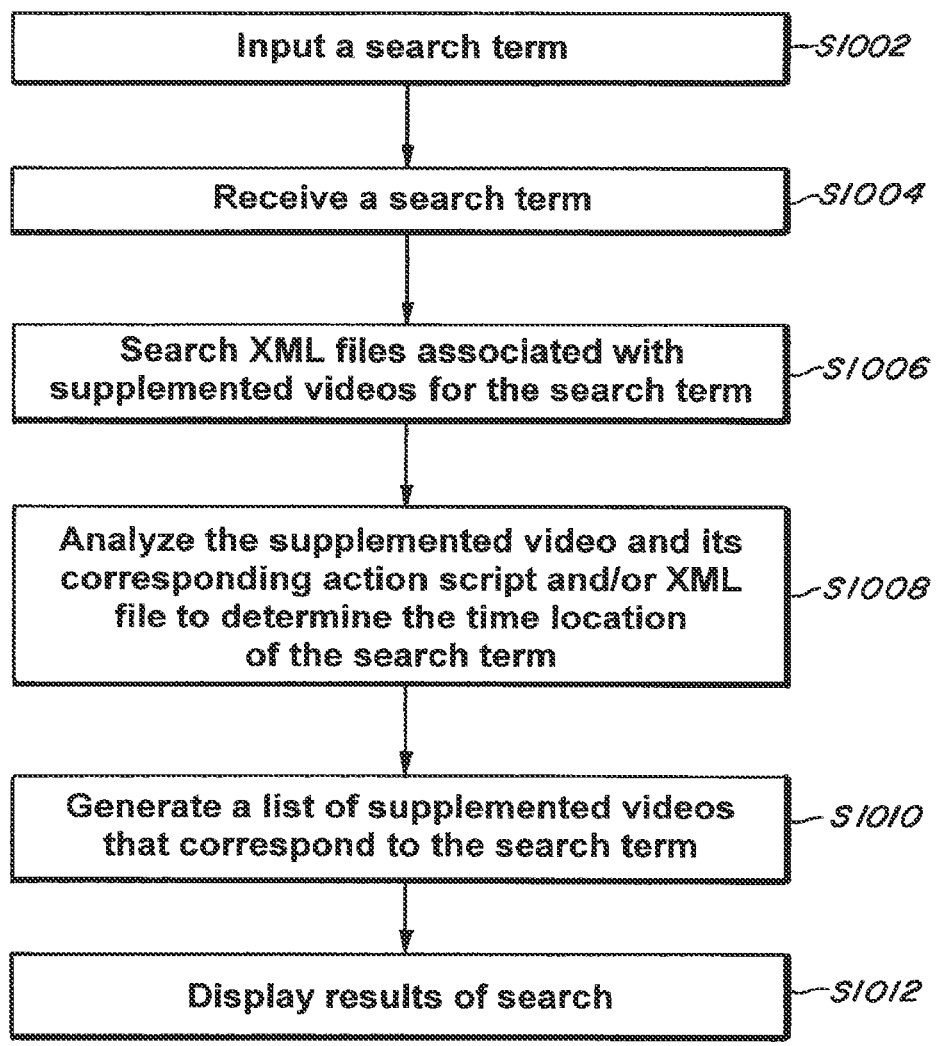
FIG. 22 is a flow chart of method for searching for an object in a plurality of supplemented videos according to an embodiment of the present invention.

In FIG. 22, the present invention includes a method to search a marketplace for an object that has a corresponding hotspot in a supplemented video using the search unit 816 and/or the processor 202. In Step S1002, a video viewer inputs a search term into the marketplace. The search unit 816 receives the search term in Step S1004. The search term can be a search term for an object. The search unit 816 then defines a search query based on the search term. In Step S1006, the search unit 816 searches a set of XML files based on the search query to identify supplemented videos including hotspots associated with the search term or supplemented videos including hotspots associated with the object. The set of XML files can, for example, a set of XML files currently available. The set of XML files can also be a set of XML files in a particular category.

Once the search term is located, the search unit 816 determines the action script and the supplemented video associated with the XML file. In Step S1008, the search unit 816 analyzes the supplemented video and its corresponding action script and/or XML file to determine the time location of the search term. In Step S1010, the search unit 816 generates a list of supplemented videos that have a hotspot of the object that corresponds to the search term. In Step S1012, the search unit 816 displays the search results using the display 214 and/or the processor 202.

The list of the supplemented videos can include the time location where the search term was found. This allows the video viewer to easily determine the time location in the supplemented video where the object is displayed. With the present invention, the video viewer does not have to watch all of the supplemented video, but instead can skip to the appropriate time in the supplemented video to view the object that he is interested in. This can improve sales of the object since the video viewer can watch view more objects in the same amount of time it would have taken for him to view one complete supplemented video. Furthermore, the video viewer may be encouraged to view more objects since he will not have to watch all of a supplemented video in order to view the object of interest. Furthermore, since some objects may be obscure, the video viewer can now easily determine what time frame to look for the object in the supplemented video. Optionally, the search unit 816 could also determine and provide a location in the display 214 where the object will appear based on the hotspot associated with the object. This could also improve an ability of the video viewer to identify the object in the supplemented video.

In one embodiment, marketplace can also be used for electronic garage sales. In such an embodiment, the video producer generates a supplemented video including the objects that he wishes to sell. These can be either new or used items. These could also be items that the video producer does not want anymore. This allows the video producer to easily sell items since the video viewer will have a better knowledge of the items that the video producer is selling.

In another embodiment, the marketplace can be used to sell new items, overstock items, used items, second hand items, or any other types of items. The marketplace can also be used to hold auctions for such items. Thus, the marketplace can be an electronic marketplace to replace or supplement a brick and mortar store.

In yet another embodiment, the marketplace can also be used to search for services in addition to products. For example, the marketplace can be used to search supplemental videos which are how-to videos, educational videos, historic videos, repair service videos, etc. If the supplemented videos are for services, for example, the marketplace allows the video viewer to see samples of the service provider's work, such as a completed roof for roof repairs. Furthermore, the supplemented videos could also detail a process to be completed for a roof repair. For example, in order to prepare a home owner for what to expect during a roof repair of the home owner's home, a roofing contractor could have a supplemented video to show the home owner all of the exact steps that will be performed, including what his home and roof will look like before, during, and after the roof repairs. This can allow the home owner to prepare for the roof repair process and move his automobile from a parked location close to the home, for example, if a large amount of working space is needed immediately adjacent the home.

Figure 23:
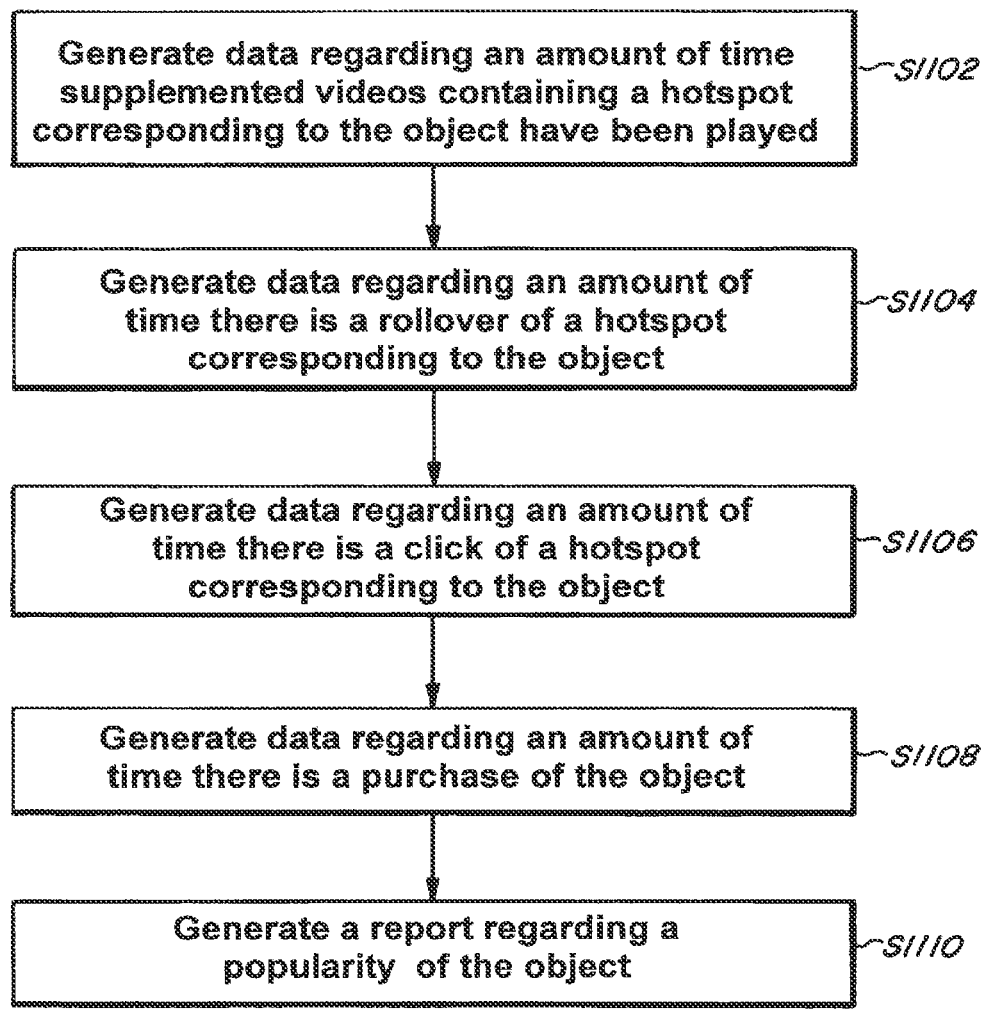
FIG. 23 is a flow chart of a method for generating a report regarding a popularity of an object according to an embodiment of the present invention.

In another embodiment the present invention is a method for generating a report regarding a popularity of an object as shown in FIG. 23. Since the present invention allows the video viewer to interact with the supplemented video, the present invention allows for a more accurate determination of how popular an object is based on the interactions the video viewer has with the supplemented video.

In FIG. 23, the processor 202 generates data regarding an amount of time supplemented videos containing a hotspot corresponding to the object has been played in Step S1102. For example, if an object has a hotspot corresponding to it in videos A, B, and C, then the processor 202 would determine an amount of time the videos A, B, and C have been played.

In Step S1104, the processor 202 generates data regarding an amount of time there is a mouse rollover of a hotspot corresponding to the object. For example, if there are 600 mouse rollovers of the hotspot corresponding to the object in video A, 300 mouse rollovers of the hotspot corresponding to the object in video B, and 200 mouse rollovers of the hotspot corresponding to the object in the video C, then there will 1,100 mouse rollovers for the object.

In Step S1106, the processor 202 generates data regarding an amount of time there is a mouse click of a hotspot corresponding to the object. For example, if there are 1,000 mouse clicks of the hotspot corresponding to the object in video A, 500 mouse clicks of the hotspot corresponding to the object in video B, and 400 mouse clicks of the hotspot corresponding to the object in the video C, then there will be 1,900 mouse clicks for the object.

In Step S1108, the processor 202 generates data regarding an amount of time there is a purchase of the object. Thus, all purchases for the object am aggregated. In Step S1110, the processor 202 generates a report regarding a popularity of the object using one or more of the data regarding the amount of time supplemented videos containing the hotspot corresponding to the object have been played, data regarding the amount of time there is a mouse rollover of the hotspot corresponding to the object, data regarding the amount of time there is a mouse click of the hotspot corresponding to the object, and data regarding the amount of time there is a purchase of the object.

The processor 202 could also generate data regarding a number of buys per mouse rollover, information regarding which Web site the supplemented video was played on, debit versus credit card versus charge card type of payment, payments made through which types of credit institutions, popularity of a particular advertisement, type of computers of the video viewers, popularity of the object based on the positioning, shape, size, color, shading, or outlining of the hotspot, or any other useful information. Furthermore, the processor 202 could also generate data regarding the video producers in addition to the video viewers. The report regarding a popularity of the object can be broken down further by time, IP addresses, geographic location, gender, age, employment, income, or other demographical breakdowns.

The report regarding a popularity of the object can also be sold for a fee. Furthermore, the report regarding a popularity of the object can be aggregated with other reports regarding a popularity of other objects.

The aggregated report can be used to generate other reports regarding the type of objects that video viewers in a particular demographic are viewing or purchasing. In such a case, the reports can be broken down by types of objects, mouse rollovers, mouse clicks on hotspots, purchasing, etc. For example, the other reports can contain information regarding the type of objects that video viewers in the 18-35 age range have interacted with respect to hotspots corresponding to the object, such as by placing the mouse cursor over the hotspot or clicking on the hotspot. The aggregated reports and/or the other reports can also be sold for a fee.

While the specification has been disclosed in relation to the exemplary and non-limiting embodiments provided herein, it is noted that the inventive principles are not limited to these embodiments and include other permutations and deviations without departing from the spirit of the disclosure.

What is claimed is:

1. A method for generating a modified supplemented video file, comprising:
    receiving a supplemented video file configured to display an interactive video, the supplemented video file associated with one or more data files including information corresponding to a set of hotspots embedded in the supplemented video file, each hotspot from the set of hotspots corresponding to a position of a portion of a scene depicting an object from a set of objects featured in the interactive video and each hotspot configured to be activated by an interaction with the interactive video to initiate an action associated with that hotspot;
    receiving updated information corresponding to a first hotspot from the set of hotspots, the updated information configured to update the first hotspot to change the action associated with the first hotspot that is initiated in response to the interaction associated with the first hotspot to an updated action;
    modifying the one or more data files to include the updated information corresponding to the first hotspot;
    modifying the supplemented video file to generate the modified supplemented video file configured to display a modified interactive video such that the interaction associated with the first hotspot initiates the updated action.

2. The method of claim 1, wherein the one or more data files include a first data file including information associated with the set of objects and the set of hotspots, and a second data file including information indicating the action associated with each hotspot from the set of hotspots.

3. The method of claim 1, wherein the action associated with the first hotspot includes
displaying, upon activation of the first hotspot, a first caption associated with a first object from the set of objects, and
the updated action associated with the first hotspot includes
displaying, upon activation of the first hotspot, a second caption associated with the first object, the second caption different than the first caption.

4. The method of claim 1, wherein the interaction is at least one of a click or a rollover.

5. The method of claim 1, wherein the action associated with the first hotspot, upon activation, includes
at least one of (1) display a caption text associated with a first object from the set of objects, (2) display an image associated with the first object, (3) complete a transaction to purchase a first product or service associated with the first object, and (4) generate a widget associated with the supplemented video file; and
the updated action associated with the first hotspot is different than the action associated with the first hotspot, and includes, at least one of (1) display a caption text associated with the first object, (2) display an image associated with the first object, (3) complete a transaction to purchase a second product or service associated with the first object, and (4) generate a widget associated with the supplemented video file.

6. The method of claim 1, wherein the interaction with the first hotspot that initiates the action is the same as the interaction with the first hotspot that initiates the updated action.

7. The method of claim 1, wherein the interaction with the first hotspot that initiates the action is different than the interaction with the first hotspot that initiates the updated action.

8. The method of claim 3, wherein the first caption includes an indication of a first value associated with a parameter of a product or service associated with the first object, the parameter being at least one of a description, a rating, an inventory, a price, or a latest bid in an auction; and
the second caption includes an indication of a second value associated with the parameter of the product or service associated with the first object, the second value different than the first value.

9. The method of claim 3, wherein the first caption or the second caption is displayed at a location that is adjacent to the hotspot or overlayed on the hotspot in the interactive video.

10. The method of claim 2, wherein the modifying the one or more data files includes modifying the second data file to alter the information indicating the action associated with the first hotspot from the set of hotspots to indicate the updated action associated with the first hotspot.

11. The method of claim 2, wherein the scene is a first scene and the object is a first object, the method further comprising:
modifying the first data file to include a new hotspot with the set of hotspots, the new hotspot different than the remaining hotspots from the set of hotspots, the new hotspot corresponding in position to a portion of a second scene depicting a second object from the set of objects featured in the interactive video, the new hotspot configured to be activated by a third interaction, the third interaction over at least a portion of the depiction of the second object in the interactive video to initiate an action associated with the new hotspot.

12. A non-transitory processor-readable medium storing code representing instructions to be executed by a processor, the instructions comprising code to cause the processor to:
receive a supplemented video file configured to display an interactive video, the supplemented video file associated with one or more data files including information corresponding to a set of hotspots embedded in the supplemented video file, each hotspot from the set of hotspots corresponding to a position of a portion of a scene depicting an object from a set of objects featured in the interactive video and each hotspot configured to be activated by an interaction with the interactive video, to initiate an action associated with that hotspot;
receive updated information corresponding to a first hotspot from the set of hotspots, the updated information configured to update the first hotspot to change the action associated with the first hotspot to an updated action;
modify the one or more data files to include the updated information corresponding to the first hotspot; and
modify the supplemented video file to generate the modified supplemented video file configured to display a modified interactive video such that the interaction associated with the first hotspot initiates the updated action.

13. The non-transitory processor-readable medium of claim 12, wherein the action associated with the first hotspot includes displaying, upon activation of the hotspot, a first caption associated with a first from the set of objects, and the updated action associated with the first hotspot includes displaying, upon activation of the first hotspot, a second caption associated with the first object, the second caption different than the first caption.

14. The non-transitory processor-readable medium of claim 13, wherein
the first caption includes an indication of a first value associated with a parameter of a product or service associated with the first object, the parameter being at least one of a rating, an inventory, a price, or a location for sale; and
the second caption includes an indication of a second value associated with the parameter of the product or service associated with the first object, the second value different than the first value.

15. The non-transitory processor-readable medium of claim 12, wherein the one or more data files include a first data file including information associated with the set of objects and the set of hotspots, and a second data file including information indicating the action associated with each hotspot from the set of hotspots.

16. The non-transitory processor-readable medium of claim 15, wherein the code to cause the processor to modify the one or more data files includes code to cause the processor to modify the second data file to alter the information indicating the action associated with the first hotspot from the set of hotspots to indicate the updated action associated with the first hotspot.

17. The non-transitory processor-readable medium of claim 12, wherein the action associated with the first hotspot, upon activation, includes at least one of (1) display a caption text associated with a first object from the set of objects, (2) display an image associated with the first object, (3) complete a transaction to purchase a product or service associated with the first object, and (4) generate a widget associated with the supplemented video file; and the updated action associated with the hotspot, upon activation, is different than the action associated with the hotspot, and includes at least one of (1) display a caption text associated with the first object, (2) display an image associated with the first object, (3) complete a transaction to purchase a product or service associated with the first object, and (4) generate a widget associated with the supplemented video file.

18. An apparatus, comprising:

a memory; and a processor operatively coupled to the memory, the processor configured to:

receive a supplemented video file configured to display an interactive video, the supplemented video file associated with one or more data files including information corresponding to a set of hotspots embedded in the supplemented video file, each hotspot from the set of hotspots corresponding to a position of a portion of a scene depicting an object from a set of objects featured in the interactive video, and each hotspot configured to be activated, by an interaction with the interactive video, to initiate an action associated with that hotspot;

receive updated information corresponding to a first hotspot from the set of hotspots, the updated information configured to update the first hotspot to change the action associated with the first hotspot in response to a first interaction associated with the first hotspot to an updated action associated with that hotspot in response to a second interaction associated with the first hotspot;

modify the one or more data files to include the updated information corresponding to the first hotspot; and modify the supplemented video file to generate the modified supplemented video file configured to display a modified interactive video such that the second interaction associated with the first hotspot initiates the updated action.

19. The apparatus of claim 18, wherein the first interaction is different than the second interaction.

20. The apparatus of claim 18, wherein the processor configured to modify the one or more data files is configured to modify the second data file to alter the information indicating the action associated with the first hotspot from the set of hotspots to indicate the updated action associated with the first hotspot.

* * * * *